(12) United States Patent
Watanabe

(10) Patent No.: US 7,324,139 B2
(45) Date of Patent: *Jan. 29, 2008

(54) DIGITAL CAMERA, A METHOD OF SHOOTING AND TRANSFERRING TEXT

(75) Inventor: Yoshikazu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1356 days.

This patent is subject to a terminal disclaimer.

(21) Appl. No.: 09/764,431

(22) Filed: Jan. 19, 2001

(65) Prior Publication Data

US 2001/0020977 A1 Sep. 13, 2001

(30) Foreign Application Priority Data

Jan. 20, 2000 (JP) .............................. 2000-012217

(51) Int. Cl.
*H04N 5/76* (2006.01)
*H04N 1/04* (2006.01)
*G06F 15/00* (2006.01)
*H04N 5/228* (2006.01)

(52) U.S. Cl. .............................. 348/231.3; 348/222.1; 358/1.15; 358/488

(58) Field of Classification Search ................ 348/220, 348/333.01; 355/18; 710/62
See application file for complete search history.

(56) References Cited

U.S. PATENT DOCUMENTS

| | | | | |
|---|---|---|---|---|
| 6,167,469 A | * | 12/2000 | Safai et al. ............ | 348/333.01 |
| 6,259,469 B1 | * | 7/2001 | Ejima et al. ............. | 348/14.01 |
| 6,304,313 B1 | * | 10/2001 | Honma ........................ | 355/18 |
| 6,389,179 B1 | * | 5/2002 | Katayama et al. .......... | 382/284 |
| 6,980,668 B1 | * | 12/2005 | Naito et al. ................. | 382/100 |
| 2001/0015760 A1 | * | 8/2001 | Fellegara et al. ....... | 348/333.01 |

FOREIGN PATENT DOCUMENTS

| | | |
|---|---|---|
| JP | 2-21782 | 1/1990 |
| JP | 6-256907 | 9/1994 |
| JP | 7-212707 | 8/1995 |
| JP | 7-336581 | 12/1995 |
| JP | 8-125870 | 5/1996 |
| JP | 9-23375 | 1/1997 |
| JP | 9-23375 A * | 1/1997 |
| JP | 9-135430 | 5/1997 |
| JP | 10-3109 | 1/1998 |
| JP | 10-65867 | 3/1998 |
| JP | 10-173978 | 6/1998 |
| JP | 10-336574 | 12/1998 |
| JP | 11-46331 | 2/1999 |

* cited by examiner

*Primary Examiner*—John Miller
*Assistant Examiner*—Heather R. Jones
(74) *Attorney, Agent, or Firm*—Oblon, Spivak, McClelland, Maier & Neustadt, P.C.

(57) ABSTRACT

A digital camera capable of enhancing utilization of an image shot in a text shooting mode is provided. An image processing unit converts an image shot in the text shooting mode to a data format appropriate to a transmission destination (a facsimile machine, a personal computer, etc.) selected by a user.

18 Claims, 12 Drawing Sheets

111

| DESTINATION | TYPE | TELEPHONE NUMBER | MAIL ADDRESS | GUIDANCE FRAME DISPLAY INFORMATION | DOCUMENT SIZE | IMAGE DELETION FLAG |
|---|---|---|---|---|---|---|
| A COMPANY | PC | — | http://www.a.co.jp | 0 | — | 0 |
| TARO YAMAMOTO | FAX | 03-3541-1799 | — | 1 | A4 | 1 |
| B CORPORATION | PC | — | http://www.b.co.jp | 0 | — | 0 |
| C SHOP | FAX | 03-3683-1234 | — | 1 | B5 | 1 |
| HANAKO ISHIYAMA | FAX | 03-3543-2222 | — | 1 | A4 | 0 |
| . | . | . | . | . | . | . |
| . | . | . | . | . | . | . |
| . | . | . | . | . | . | . |

FIG.8

| DESTINATION | TYPE | TELEPHONE NUMBER | MAIL ADDRESS | GUIDANCE FRAME DISPLAY INFORMATION | DOCUMENT SIZE | IMAGE DELETION FLAG |
|---|---|---|---|---|---|---|
| A COMPANY | PC | — | http://www.a.co.jp | 0 | — | 0 |
| TARO YAMAMOTO | FAX | 03-3541-1799 | — | 1 | A4 | 1 |
| B CORPORATION | PC | — | http://www.b.co.jp | 0 | — | 0 |
| C SHOP | FAX | 03-3683-1234 | — | 1 | B5 | 1 |
| HANAKO ISHIYAMA | FAX | 03-3543-2222 | — | 1 | A4 | 0 |
| · | · | · | · | · | · | · |
| · | · | · | · | · | · | · |
| · | · | · | · | · | · | · |

111

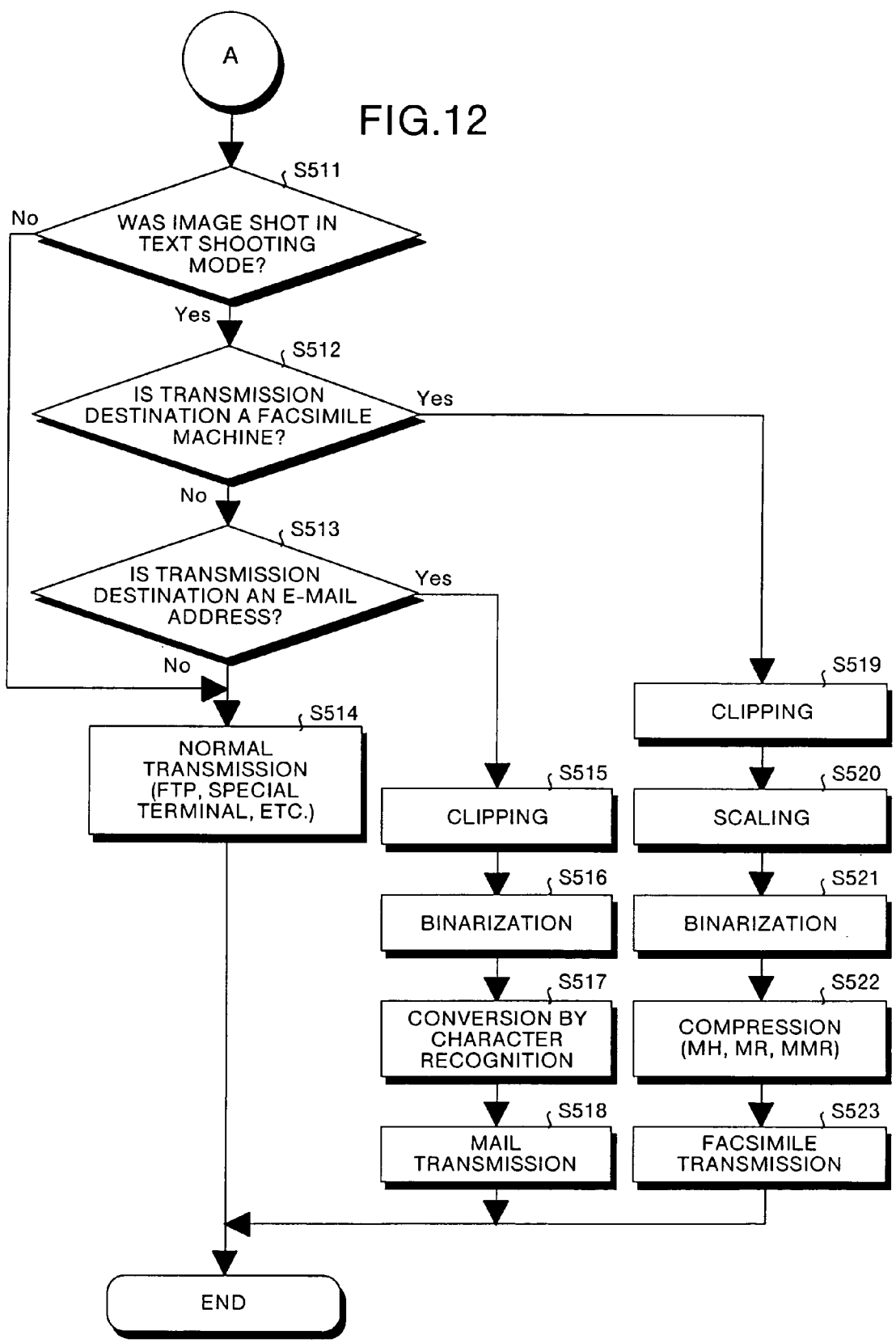

DIGITAL CAMERA, A METHOD OF SHOOTING AND TRANSFERRING TEXT

FIELD OF THE INVENTION

The present invention in general relates to a digital camera. More particularly, this invention relates to a digital camera having a normal shooting mode and a text shooting mode.

BACKGROUND OF THE INVENTION

A multi-functional digital camera having a text shooting mode, in addition to a normal shooting mode, has appeared in the market. The normal shooting mode is a mode in which natural images, such as a normal snaps, are shoot. On the other hand, the text shooting mode is a mode in which text printed on a printing medium, such as a paper, are shoot. The images shoot in the text shooting mode may be then subjected to character recognition etc.

Japanese Patent Application Laid-Open (JP-A) No. 8-125870 discloses a digital still camera having a normal shooting mode and a text shooting mode. The two modes can be switched as desired. The disclosed camera comprises natural image compressing unit for compressing the acquired image data when the normal shooting mode is selected. On the other hand, this camera comprises a text compressing unit (compressing unit suitable to a small-step gray-scaling image) when the text shooting mode is selected. The compressed image data is stored in an external memory. Thus, the image data can be compressed efficiently without deteriorating the image quality in shooting either a natural image or text.

The above conventional digital camera, however, has a problem that it cannot utilize captured image data efficiently. More specifically, the digital camera having the text shooting mode cannot use a captured image directly for facsimile transmission or the like. Thus, in order to use the captured image for facsimile transmission, there is a problem that one has to transfer an image shot by the digital camera to a computer, and finish a procedure including decompression, image conversion, and compression, etc. before the transmission.

Furthermore, a compressing method is determined unambiguously in response to the shooting mode, and for example, in case of shooting a text (encyclopedia, etc.) with a natural image printed therein, if the text is shot in the text mode, it is compressed by a compressing method suitable to a small-step gray scale image, thereby making it impossible to reproduce the natural image portion. Therefore, in order to reproduce the natural image portion, the user has to shoot the text in the normal shooting mode all over again. Hence, the user has to select and use the mode for a specific purpose.

SUMMARY OF THE INVENTION

It is an object of the present invention to provide a digital camera capable of enhancing utilization of an image shot in the text shooting mode.

The digital camera according to one aspect of the present invention comprises an image pickup unit which captures an image of a subject and converts the image into image data; a compressing unit which generates compressed image data by compressing the image data outputted from the image pickup unit; a storage unit which stores the compressed image data; decompressing unit which decompresses the compressed image data; a switching unit which switches the normal shooting mode to the text shooting mode and vice versa; and an image processing unit which performs image processing to the image data, wherein, after the decompressing unit decompresses the compressed image data of an image captured in the text shooting mode and stored in the storage unit, the image processing unit effects image processing appropriate to a transmission destination to resulting decompressed image data. Thus, after the decompressing unit decompresses the compressed image data of an image captured in the text shooting mode and stored in the storage unit, the image processing unit effects image processing appropriate to a transmission destination to resulting decompressed image data.

The digital camera according to another aspect of the present invention comprises an image pickup unit which captures an image of a subject and converts the image into image data; a switching unit which switches the normal shooting mode to the text shooting mode and vice versa; and an image processing unit which performs image processing appropriate to a transmission destination to the image data of an image captured in the text shooting mode. Thus, the image processing unit effects image processing appropriate to a transmission destination to the image data of an image captured in the text shooting mode.

The digital camera according to still another aspect of the present invention comprises an image pickup unit which captures an image of a subject and converts the image into image data; a compressing unit which generates compressed image data by compressing the image data outputted from the image pickup unit; a storage unit which stores the compressed image data; decompressing unit which decompresses the compressed image data; a switching unit which switches the normal shooting mode to the text shooting mode and vice versa; and an image processing unit which performs image processing to the image data, wherein, after the decompressing unit decompresses the compressed image data of an image captured in the text shooting mode and stored in the storage unit, the image processing unit effects processing including clipping, small-step gray scaling, and resolution changing to resulting decompressed image data, and further recompresses resulting processed image data. Thus, after the decompressing unit decompresses the compressed image data of an image captured in the text shooting mode and stored in the storage unit, the image processing unit effects processing including clipping, small-step gray scaling, and resolution changing to resulting decompressed image data, and further recompresses resulting processed image data.

The digital camera according to still another aspect of the present invention comprises an image pickup unit which captures an image pickup unit which captures an image of a subject and converts the image into image data; a switching unit which switches the normal shooting mode to the text shooting mode and vice versa; and an image processing unit which performs image processing including clipping, small-step gray scaling, and resolution changing to the image data of an image captured in the text shooting mode, and compresses the obtained image data. Thus, the image processing unit effects processing including clipping, small-step gray scaling, and resolution changing to the image data of an image captured in the text shooting mode, and further compresses resulting processed image data.

The digital camera according to still another aspect of the present invention comprises an image pickup unit which captures an image pickup unit which captures an image of a subject and converts the image into image data; a compressing unit which generates compressed image data by compressing the image data outputted from the image pickup unit; a storage unit which stores the compressed image data; decompressing unit which decompresses the compressed image data; a switching unit which switches the normal shooting mode to the text shooting mode and vice versa; and an image processing unit which performs image processing to the image data, wherein, after the decompressing unit decompresses the compressed image data of an image captured in the text shooting mode and stored in the storage unit, the image processing unit effects processing including clipping and small-step gray scaling to resulting decompressed image data, and further effects data processing by means of character recognition to resulting processed image data. Thus, after the decompressing unit decompresses the compressed image data of an image captured in the text shooting mode and stored in the storage unit, the image processing unit effects processing including clipping and small-step gray scaling to resulting decompressed image data, and further effects data processing by means of character recognition to resulting processed image data.

The digital camera according to still another aspect of the present invention comprises an image pickup unit which captures an image pickup unit which captures an image of a subject and converts the image into image data; a switching unit which switches the normal shooting mode to the text shooting mode and vice versa; and an image processing unit which performs processing including clipping and small-step gray scaling to the image data of an image captured in the text shooting mode, and further effecting data processing by means of character recognition to resulting processed image data. Thus, the image processing unit effects processing including clipping and small-step gray scaling to the image data of an image captured in the text shooting mode, and further effects data processing by means of character recognition to resulting processed image data.

Furthermore, in the text shooting mode, the storage unit stores shooting condition data in a one-to-one correspondence with the compressed image data, and the image processing unit effects the image processing to the image data based on the shooting condition data. Thus, the storage unit stores shooting condition data in a one-to-one correspondence with the compressed image data, and the image processing unit effects the image processing to the image data based on the shooting condition data.

The digital camera further comprises a data communication unit which allows a data communication with an external device. Thus, a data communication with an external device is allowed by the data communication unit.

The digital camera further comprises a memory which stores name and/or telephone number and/or address of a destination, and an image deleting flag that specifies whether the image data should be deleted or not after transmission in a one-to-one correspondence; and a deleting unit which deletes the image data that has been transmitted through the data communication unit in accordance with the image deleting flag stored in the memory. Thus, the name and telephone number or address of a destination, and the deleting flag that specifies whether the image data should be deleted or not after transmission are stored in the memory in a one-to-one correspondence, and the deleting unit deletes the image data that has been transmitted through the data communication unit in accordance with the image deleting flag stored in the memory.

The digital camera further comprises a deleting unit which deletes the image data that has been transmitted through the data communication unit depending on a transmission destination. Thus, the deleting unit deletes the image data that has been transmitted through the data communication unit depending on a transmission destination.

The digital camera according to still another aspect of the present invention comprises an image pickup unit which captures an image pickup unit which captures an image of a subject and converts the image into image data; a compressing unit which generates compressed image data by compressing the image data outputted from the image pickup unit; a storage unit which stores the compressed image data; a switching unit which switches the normal shooting mode to the text shooting mode and vice versa; and a display unit which displays on a monitor a video of the subject before being shot, wherein, in the text shooting mode, the display unit displays guidance to notify a shooting condition of a text while displaying on the monitor the video of the subject before being shot. Thus, in the text shooting mode, the display unit displays guidance to notify a shooting condition of a text while displaying on the monitor the video of the subject before being shot.

The digital camera according to still another aspect of the present invention comprises an image pickup unit which captures an image pickup unit which captures an image of a subject and converts the image into image data; a switching unit which switches the normal shooting mode to the text shooting mode and vice versa; and a display unit which displays on a monitor a video of the subject before being shot, wherein, in the text shooting mode, the display unit displays guidance to notify a shooting condition of a text while displaying on the monitor the video of the subject before being shot. Thus, in the text shooting mode, the display unit displays guidance to notify a shooting condition of a text while displaying on the monitor the video of the subject before being shot.

Furthermore, the guidance includes a frame displayed to make a user aware of an area of a regular size sheet. Thus, a frame is displayed as the guidance to make a user aware of an area of a regular size sheet.

The digital camera according to still another aspect of the present invention comprises an image pickup unit which captures an image pickup unit which captures an image of a subject and converts the image into image data; a compressing unit which generates compressed image data by compressing the image data outputted from the image pickup unit; a storage unit which stores the compressed image data; a switching unit which switches the normal shooting mode to the text shooting mode and vice versa; and a shooting angle detecting unit which detects a shooting angle with respect to the subject, wherein, in the text shooting mode, shooting is started when the shooting angle becomes substantially perpendicular. Thus, in the text shooting mode, shooting is started when the shooting angle becomes substantially perpendicular.

The digital camera according to still another aspect of the present invention comprises an image pickup unit which captures an image pickup unit which captures an image of a subject and converts the image into image data; a switching unit which switches the normal shooting mode to the text shooting mode and vice versa; and a shooting angle detecting unit which detects a shooting angle with respect to the subject, wherein, in the text shooting mode, shooting is started when the shooting angle becomes substantially perpendicular. Thus, in the text shooting mode, shooting is started when the shooting angle becomes substantially perpendicular.

Furthermore, the shooting angle detecting unit detects the shooting angle by recognizing a shape of the subject being shot. Thus, the shooting angle detecting unit detects the shooting angle by recognizing a shape of the subject being shot.

The digital camera further comprises a memory which stores, in a one-to-one correspondence, name and/or telephone number and/or address of a destination, and frame display information that specifies whether or not the guidance should be displayed during shooting, wherein the display unit controls display and non-display of the guidance in accordance with the frame display information stored in the memory. Thus, name, telephone number or address of a destination, and frame display information that specifies whether or not guidance should be displayed during shooting are stored in the memory in a one-to-one correspondence, and the display unit controls display and non-display of the guidance in accordance with the frame display information stored in the memory.

Furthermore, the display unit controls display and non-display of the guidance on the display unit depending on a transmission destination.

The digital camera further comprises a manipulator which allows to arbitrarily set a content of the memory.

The method of shooting an transferring text using a digital camera according to still another aspect of the present invention comprises the steps of monitoring a subject through a display unit at a monitoring command; displaying guidance on the display unit during the monitoring; capturing and compressing image data at a shooting command; storing compressed image data in storage unit; reading out and decompressing the compressed image data stored in the storage unit at a transmission command; effecting image processing appropriate to a transmission destination to the decompressed image data; and transferring the image processing performed image data to the transmission destination. Thus, a subject is monitored through a display unit at a monitoring command; guidance is displayed on the display unit during the monitoring; image data is captured and compressed at a shooting command; compressed image data is stored in storage unit; the compressed image data stored in the storage unit is read out and decompressed at a transmission command; image processing appropriate to a transmission destination is effected to the decompressed image data; and the image data to which the image processing has been effected is transferred to the transmission destination.

The method of shooting an transferring text using a digital camera according to still another aspect of the present invention comprises the steps of monitoring a subject through a display unit at a monitoring command; displaying guidance on the display unit during the monitoring; capturing image data at a shooting command; effecting image processing appropriate to a transmission destination to captured image data; and transferring the image processing performed image data to the transmission destination. According to the twenty-first aspect, a subject is monitored through a display unit at a monitoring command; guidance is displayed on the display unit during the monitoring; image data is captured at a shooting command; image processing appropriate to a transmission destination is effected to captured image data; and the image data to which the image processing has been effected is transferred to the transmission destination.

Other objects and features of this invention will become apparent from the following description with reference to the accompanying drawings.

BRIEF DESCRIPTION OF THE DRAWINGS

FIG. 8 is a view depicting an example arrangement of a transmission destination memory of FIG. 7;

FIG. 12 shows another flowchart detailing the operation when the text shooting and transferring mode is selected in the third embodiment.

DESCRIPTION OF THE PREFERRED EMBODIMENTS

Preferred embodiments of the present invention are explained below with reference to the accompanying drawings.

Figure 1:
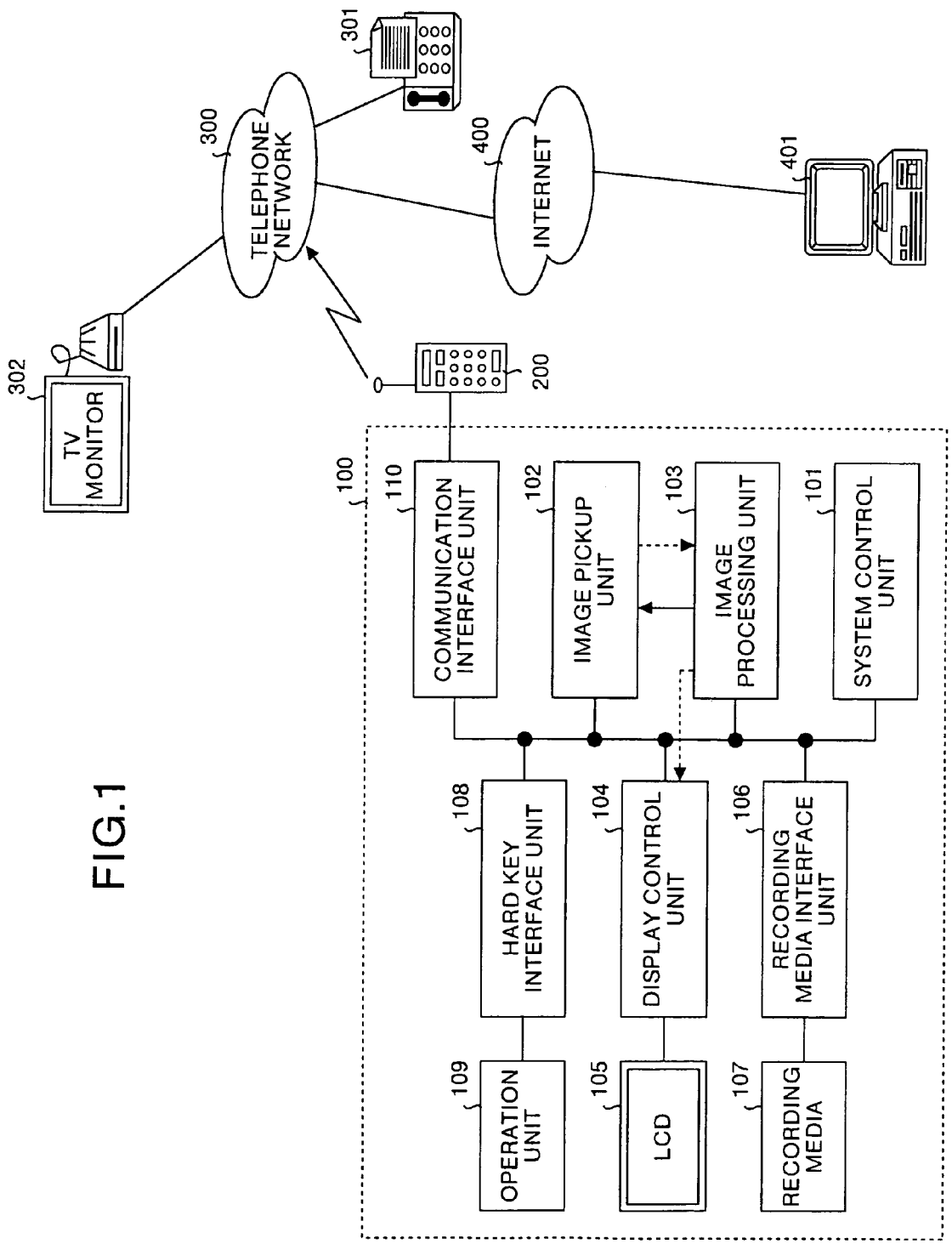
FIG. 1 is a view depicting an arrangement of a digital camera of a first embodiment.

FIG. 1 is a view showing an arrangement of a digital camera 100. This digital camera 100 includes a system control unit 101 which controls the entire device of the digital camera; an image pickup unit 102 which picks up an image of a subject and converts the same into image data; an image processing unit 103 which performs image processing or the like to the image data outputted from the image pickup unit 102; a display control unit 104 which controls a display of the image processed by the image processing unit 103 on an LCD 105; the LCD 105 which displays an image or the like; a recording media interface unit 106 serving as an interface of a recording media 107; the recording media 107 which stores compressed image data or the like; a hard key interface unit 108 which detects a key-input operation on a operation unit 109; the operation unit 109 for allowing the user to enter an operation command into the digital camera; and a communication interface unit 110 for a data communication.

The system control unit 101 controls the entire device of the digital camera. This system control unit 101 includes a CPU which controls the entire device of the digital camera in accordance with a program stored in a ROM; the ROM which stores programs used in running the CPU; a RAM used as a CPU's work area; a timer for measuring a time; and the like.

The image pickup unit 102 outputs image data by picking up an image of a subject. This image pickup unit 102 includes optical system components, such as a lens for forming an image of the subject and a lens driving motor for driving the lens; a CCD for converting the formed image of the subject into an electrical signal (analog image data); a CCD driving circuit for driving the CCD; an analog-to-digital converter for converting the analog image data outputted from the CCD into a digital signal (digital image data); and the like.

The image processing unit 103 includes an image processing DSP (Digital Signal Processor) for (1) effecting various kinds of image processing to the image data obtained by the image pickup unit 102, (2) focusing and adjusting an exposure or the like by controlling the CCD driving timing and lens driving motor in the image pickup unit 102, and (3) effecting compression/decompression to the image data; a memory; and the like.

The display control unit 104 effects signal processing to display the image data processed by the image processing unit 103 on the LCD 105, and also generates various graphic images for the user interface to display the same on the LCD 105. The LCD 105 displays an image and a graphic for the user interface thereon.

The recording media interface unit 106 is composed of a memory card controller provided as an interface with the recording media 107, and the like. The recording media 107 record various kinds of information related to compressed image data and the image.

The hard key interface unit 108 is composed of a parallel port provided to detect the hardware state for the user interface, such as keys and a dial in the operation unit 109, and the like. The operation unit 109 is used when the user wishes to enter an operation command into the digital camera, and includes: a release button for specifying a commencement of shooting; a shooting mode key for switching a normal shooting mode for shooting a natural image to a text shooting mode for shooting characters in a satisfactory manner and vice versa; a regular document size setting key for selecting a desired regular document size (the ISO size A, letter size, legal size, etc.); and the like. The communication interface unit 110 is composed of a communication controller provided for a data communication with an external device through a communication device, such as a portable phone 200, and the like.

Legend 200 denotes the portable phone connected to the communication interface unit 110 of the digital camera for a data communication with an external device. Legend 300 denotes a telephone network. Legend 301 denotes a facsimile machine linked to the telephone network 300. Legend 302 denotes a special terminal (for receiving and accumulating an image from the digital camera to display the image on a TV monitor) linked to the telephone network 300.

Also, Legend 400 denotes an internet linked to the telephone network 300. Legend 401 denotes a personal computer linked to the internet 400. A data communication is allowed between the digital camera 100 and devices (for example, the facsimile machine 301 or special terminal 302) linked to the telephone network 300 or the device (for example, the personal computer 401) linked to the internet 400 through the portable phone 200.

Next, a shooting operation by the foregoing digital camera 100 will be explained. The user initially manipulates the shooting mode key in the operation unit 109 and sets the desired shooting mode (normal shooting mode or text shooting mode) prior to the shooting. The manipulation contents on the operation unit 109 are distinguished by the system control unit 101 through the hard key interface unit 108, whereupon the system control unit 101 generates a guidance graphic in response to the manipulation and sends the same to the display control unit 104, requesting the user to execute the following manipulation.

Once the shooting mode is determined, the system control unit 101 sets processing parameters appropriate to the determined mode in the image processing unit 103. Upon detection that a not shown release button is pressed half way down after all is set for the shooting, such a manipulation is distinguished by the system control unit 101 through the hard key interface unit 108 in the same manner as the mode setting manipulation.

The image pickup unit 102 starts an image pickup operation prior to the actual shooting under the control of the image processing unit 103 so as to display a preview image on the LCD 105. The image data picked up by the image pickup unit 102 is sent successively to the image processing unit 103, which correspondingly effects the processing including color spatial conversion, a gamma correction, white balance adjustment, etc. to the image data and transfers the processed image data to the display control unit 104. At the same time, the image processing unit 103 detects focusing and an exposure and adjusts the same by controlling the image pickup unit 102.

The display control unit 104 effects the signal processing to the image data and displays the same on the LCD 105 to present the image pickup state to the user. Subsequently, when the release button in the operation unit 109 is pressed down, such a manipulation is distinguished by the system control unit 101 through the hard key interface unit 108 in the same manner as above. The image pickup unit 102 captures the image data of the subject and outputs the same to the image processing unit 103 under the control of the image processing unit 103, where upon the image processing unit 103 effects the image processing and compression appropriate to the selected shooting mode.

The system control unit 101 reads out the compressed image data compressed by the image processing unit 103, appends header information to the same, and writes the resulting image data as an image file into the recording media 107 through the recording media interface unit 106. The header information referred to herein includes information as to the selected shooting mode and information as to the shooting date, etc. Up to this point, a series of shooting operations are completed.

Figure 2:
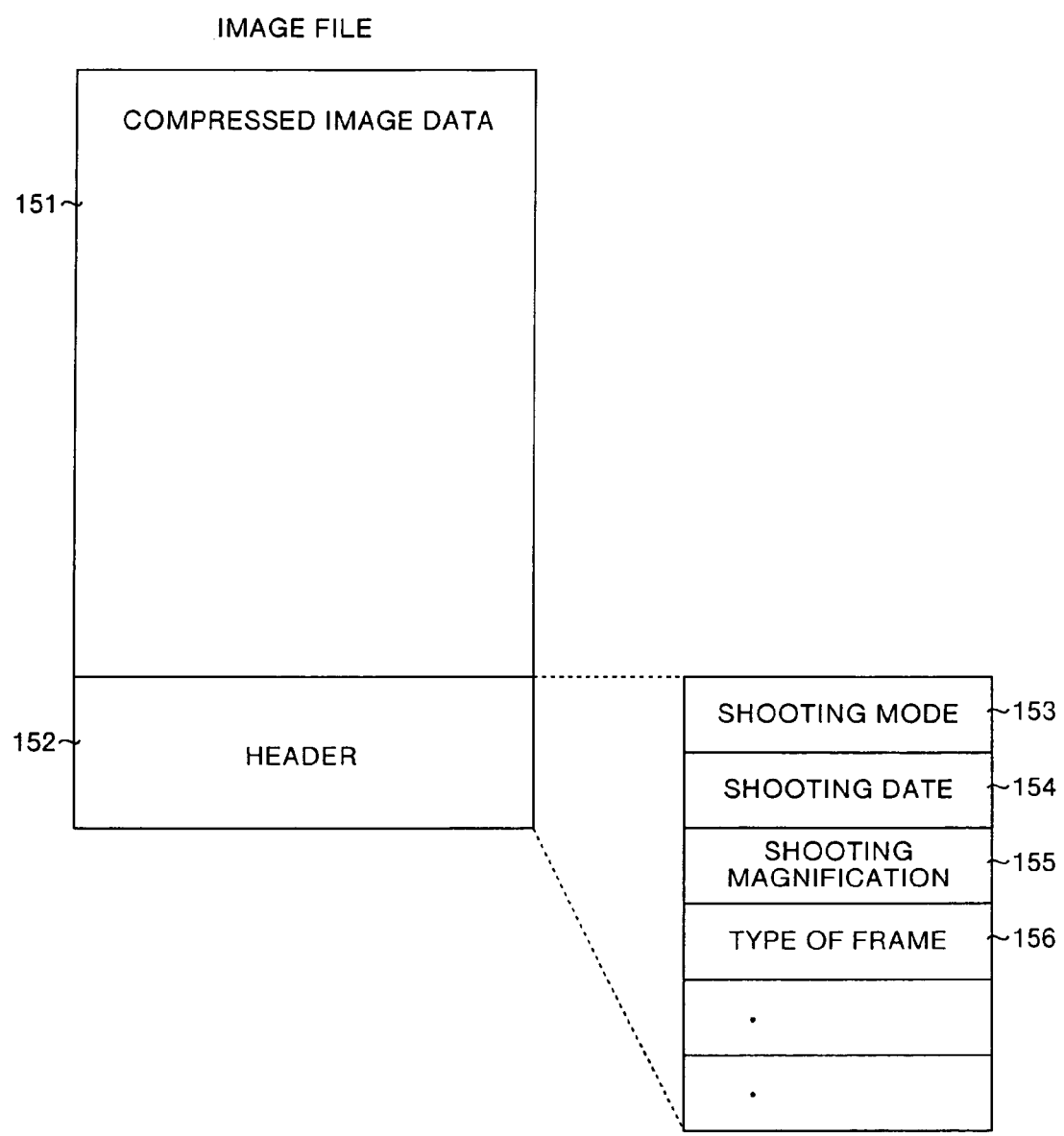
FIG. 2 is a view showing an example format of an image file.

FIG. 2 is a view showing an example format of the image file. As shown in the drawing, the image file is composed of compressed image data 151 and a header 152, and the header includes information as to the shooting mode 153, shooting date 154, shooting magnification 155, and the type of a frame 156, etc.

Next, a data communication operation by the digital camera 100 will be explained. Prior to the use of the communication function, the user connects the portable phone 200 to the digital camera 100. Then, the user specifies a transmission destination of an image and selects the image to be transmitted by manipulating the operation unit 109 in the same manner as the foregoing shooting mode setting manipulation. Meanwhile, the system control unit 101 controls the communication interface unit 110 and secures a transmission path by originating a call to the destination through the portable phone 200, after which the system control unit 101 reads out the specified image file from the recording media 107 and transmits the same by employing a predetermined protocol.

Next, the data communication operation by the digital camera 100 when communicating with: (1) the facsimile machine 301; (2) the personal computer 401; and (3) the special terminal 302, will be explained.

In case of a data communication with (1) the facsimile machine 301 (facsimile transmission), the digital camera 100 transmits an image which has been compressed and stored as binary information at the shooting to the facsimile machine 301 over the telephone network 300 by employing a facsimile protocol using the method disclosed in, for example, Japanese Patent Application Laid-Open (JP-A) No. 8-125870 supra.

In case of a data communication with (2) the personal computer 401, the digital camera 100 transmits an image to the personal computer 401 through the telephone network 300 and internet 400. In this case, an image compressed and stored in the normal shooting mode (JPEG compression) is transferred to the personal computer 401 by employing the FTP (File Transfer Protocol) or as an attachment to an e-mail by employing the SMT (Simple Mail Protocol). Herein, a connection to an unillustrated server linked to the internet 400 is generally established by employing the PPP (Point-to-Point Protocol).

In case of a data communication with (3) the special terminal 302, the digital camera 100 transmits an image to the special terminal 302 through the telephone network 300 by employing a terminal-specific protocol. The kinds of communication protocols (attributions of the destinations) are stored in the form of destination information, in which each destination and its telephone number or an internet address are stored in a one-to-one correspondence. Hence, the suitable protocol is automatically selected and executed by merely selecting the transmission destination at the user's end.

Figure 3:
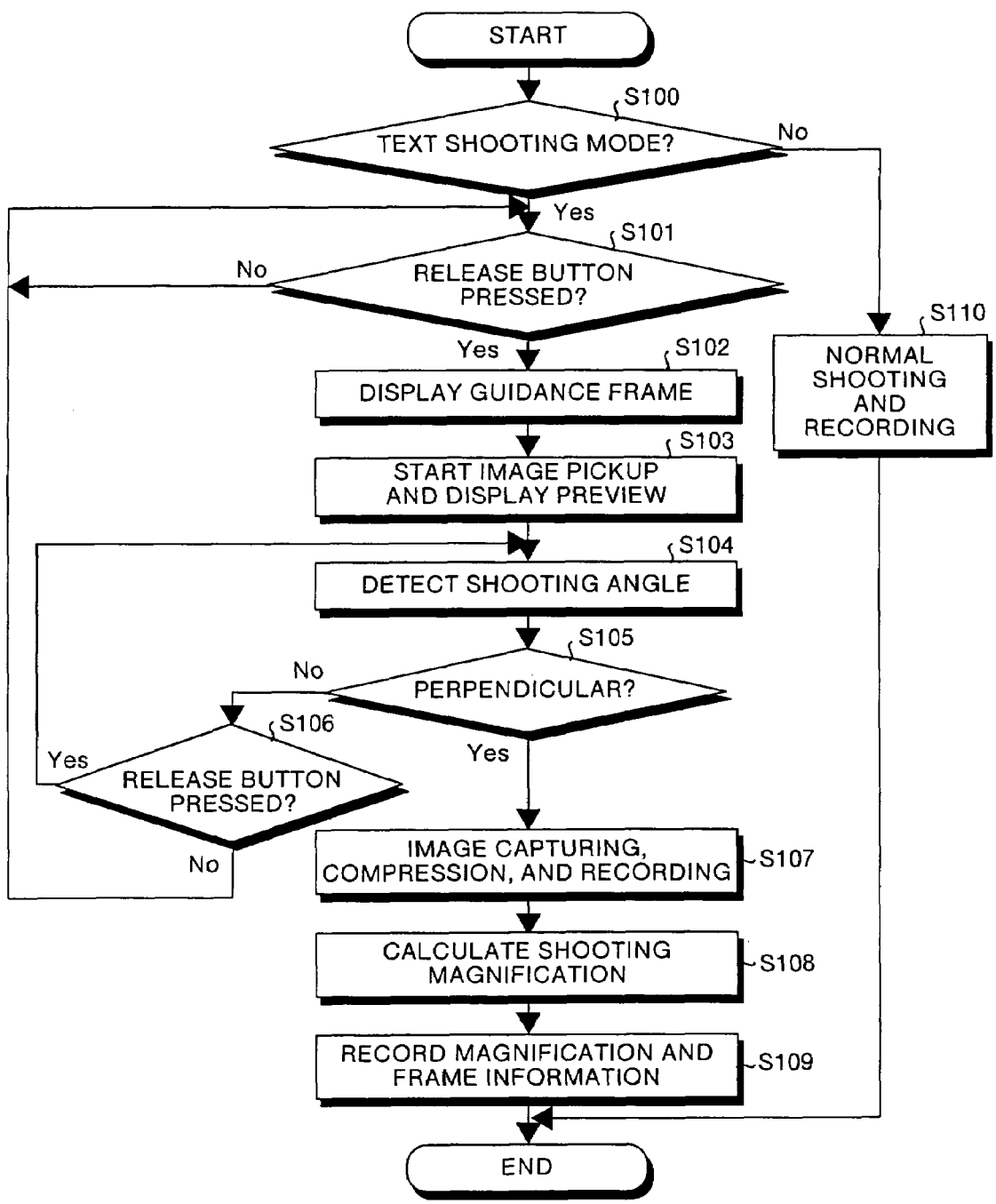
FIG. 3 shows a flowchart detailing a shooting operation when a text shooting mode is selected in the first embodiment.
Figure 4:
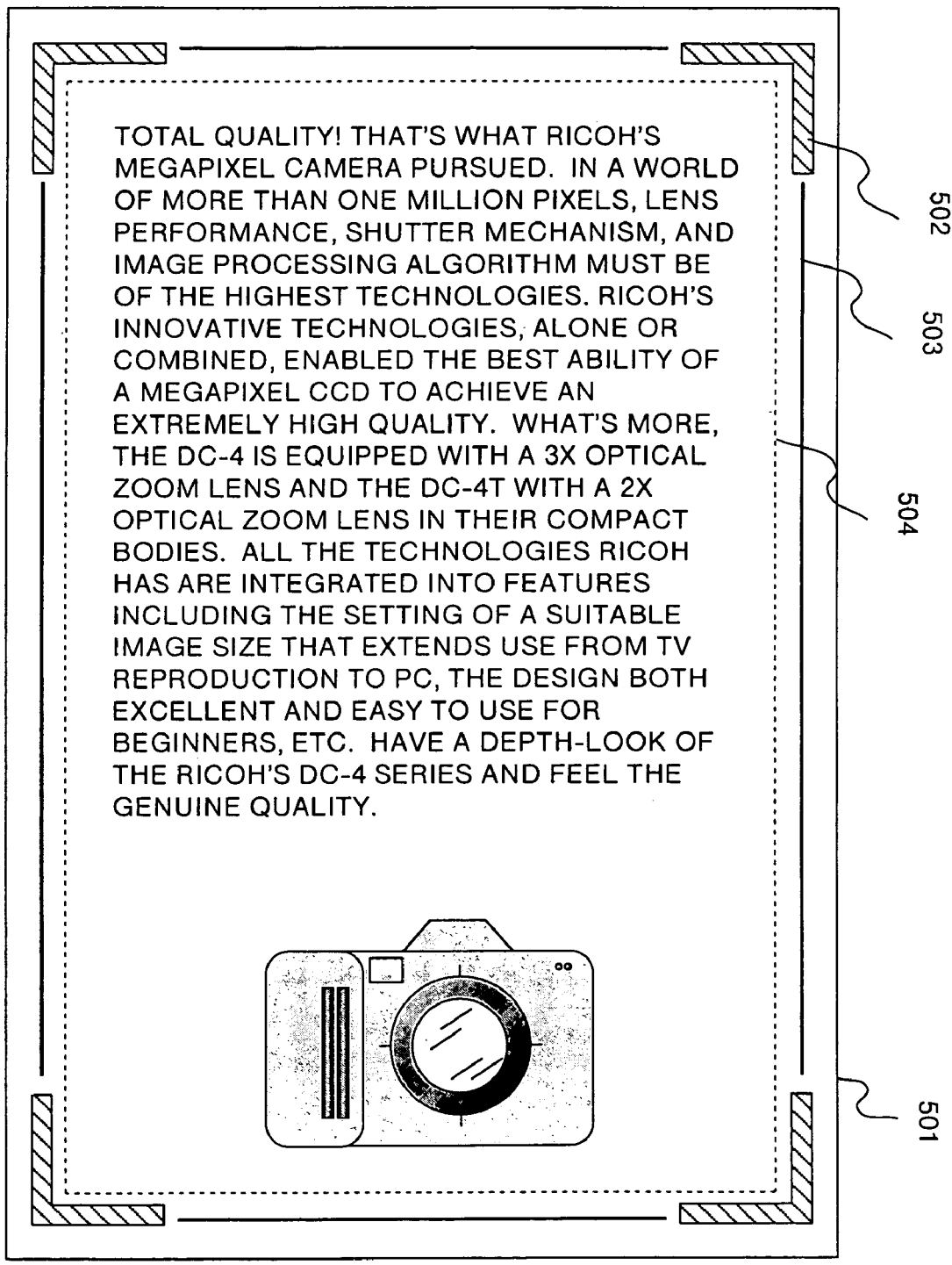
FIG. 4 is a view showing an example of a guidance display.
Figure 5A:
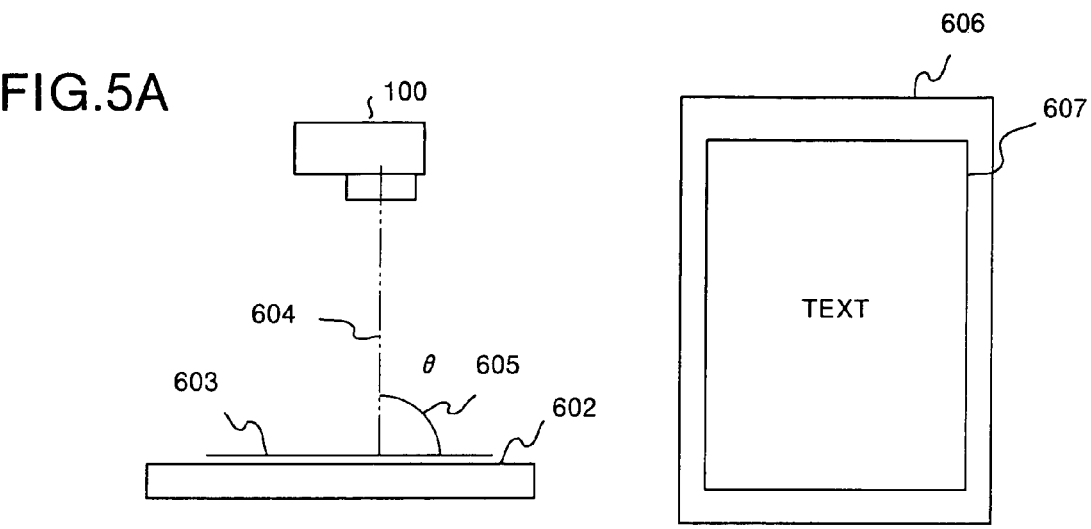
FIG. 5A and FIG. 5B are explanatory views for explaining a shooting angle.
Figure 5B:
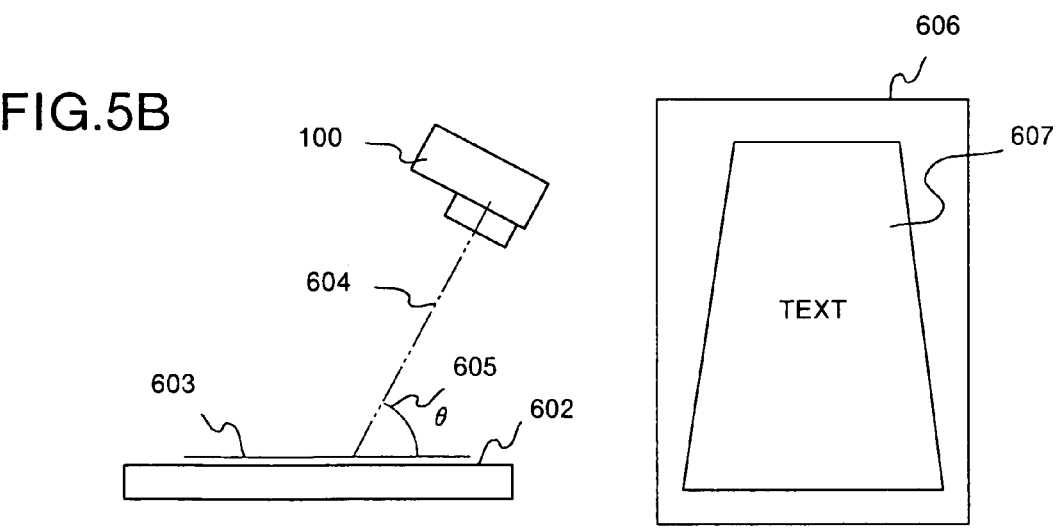

Next, a shooting operation when the text shooting mode is selected will be explained with reference to FIG. 3 to FIG. 5B. FIG. 3 shows a flowchart detailing the shooting operation when the text shooting mode is selected. FIG. 4 is a view showing an example of a guidance display on the LCD 105, and FIG. 5A and FIG. 5B are explanatory views explaining detection of a shooting angle.

In case of the shooting in the text shooting mode, the user selects the text shooting mode with the shooting mode selecting key in the operation unit 109 and a desired regular document size (the ISO size A, letter size, legal size, etc.) for an image subject to capturing with the regular document size setting key.

In FIG. 3, the system control unit 101 initially distinguishes the current shooting mode (Step S100), and when it is judged that the current mode is the normal shooting mode, the system control unit 101 proceeds to Step S110 and effects the normal shooting and recording.

On the other hand, when it is judged that the current shooting mode is the text shooting mode in Step S100, the system control unit 101 monitors the key information from the hard key interface unit 108, and upon judging that the release button is pressed down (Step S101), the system control unit 101 displays a guidance frame on the LCD 105 to make it easier for the user to fix the position of the text (Step S102), and starts the image pickup to display a preview image (display the subject on the monitor) (Step S103).

Next, display of the guidance frame will be explained with reference to FIG. 4. Legend 501 denotes a frame of the LCD 105; legend 502 denotes a displayed guidance frame; legend 503 denotes a text subject to shooting; and legend 504 denotes an area which will be cut out later by means of clipping described below. These frames are displayed in accordance with the aspect ratio equivalent to the regular document size selected when setting the text shooting mode as described above.

Subsequently, the system control unit 101 issues a command to the image processing unit 103 to detect a shooting angle with respect to the subject (text), in response to which the image processing unit 103 detects the shooting angle with respect to the subject, whereupon the system control unit 101 reads in the detected shooting angle (Step S104). Then, the system control unit 101 checks whether the shooting angle is perpendicular or not (Step S105). Next, the shooting angle and the detecting method thereof with will be explained reference to FIG. 5A and FIG. 5B.

Legend 100 denotes the digital camera; legend 602 denotes a table, on which a text 603 is placed; legend 603 denotes the text subject to shooting; legend 604 denotes an optical axis of the digital camera 100; legend 605 denotes the shooting angle; legend 606 denotes the frame of the LCD 105; and legend 607 denotes a display of the shooting state of the text 603.

FIG. 5(A) shows a case where the shooting angle is perpendicular. In this case, a rectangular text can be shot intact as a rectangle. FIG. 5(B) shows a case where the shooting angle is tilted, and in this case, a rectangular text is deformed and captured as a trapezoid. In the drawing, a tilt is given in the longitudinal direction of the text for ease of explanation. It should be appreciated, however, that a tilt can be also given to a direction that intersects with the longitudinal direction at right angles, and in this case, the text is shot as a more significantly deformed rectangle. Also, the picked up image varies continuously with the tilt of the digital camera 100.

The image processing unit 103 recognizes the shape of the captured text (not the actual text shape but the shape of the shooting image of the text being shot), and detects the state shown in FIG. 5(A) (when the shooting angle is perpendicular). The shape of the text can be recognized by any known method, and the detailed explanation is omitted herein.

When it is judged that the shooting angle is not perpendicular in Step S105, the system control unit 101 proceeds to Step 106 and checks whether the release button is pressed down or not. When the release button is not pressed down, the system control unit 101 returns to Step S101; otherwise, the system control unit 101 detects the shooting angle again (Step S104).

On the other hand, when it is judged that the shooting angle is perpendicular in Step S105, the system control unit 101 controls the image pickup unit 102 to capture the image data and the image processing unit 103 to compress the captured image data in the same manner when the release button is pressed down in the normal shooting mode, after which the system control unit 101 records the compressed image data into the recording media 107 through the recording media interface unit 106 (Step S107).

Further, the system control unit 101 reads out from the image processing unit 103 a lens-to-subject distance (a distance from the digital camera 100 to the text (text subject to shooting)) detected by means of focusing at the shooting, and computes a shooting magnification (a focal length of the lens/lens-to-subject distance) (Step S108), which is recorded into the recording media 107 in a one-to-one correspondence with the shot image together with the information related to the kind of a frame in the form of an image file (Step S109).

According to the above operation example, the guidance that enables the user to fix the position of the text is displayed at the shooting in the text shooting mode. Consequently, the user can fix the position of the text, thereby making the operation more convenient to the user.

In addition, according to the above operation example, the guidance frame that makes the user aware of the area in accordance with the aspect ratio equivalent to the regular size sheet is displayed as the guidance. Consequently, the user can fix the position of the text in accordance with the size of the regular size sheet, thereby making the operation more convenient to the user.

In addition, according to the above operation example, in case of the shooting in the text shooting mode, the shooting starts automatically when the shooting angle becomes perpendicular with respect to the text. Consequently, the text can be shot at the adequate angles, thereby making the operation more convenient to the user.

Also, according to the above operation example, the image processing unit 103 detects the shooting angle by recognizing the shape of the picked up image of the shot text. Consequently, the shooting angle can be detected correctly regardless of the state of the text subject to shooting, and the shooting angle can be detected by a simple and inexpensive arrangement. In addition, the detection may be possible by using a gravity sensor or the like on the assumption that the text is generally placed in a direction perpendicular or horizontal with respect to the direction of gravity. However, compared with such a detecting method, by adapting the method of detecting the shooting angle by means of image processing, both the size and cost of the device can be decreased.

Also, according to the above operation example, in the text shooting mode, the shooting condition data (shooting magnification, information as to the kind of a frame (guidance frame information)) is recorded in the recording media 107 in a one-to-one correspondence with the compressed image data. Consequently, when the image is transmitted to an external device (for example, a facsimile machine, a personal computer, etc.), it is possible to readily effect the image processing appropriate to the destination by exploiting the shooting condition data.

Figure 6:
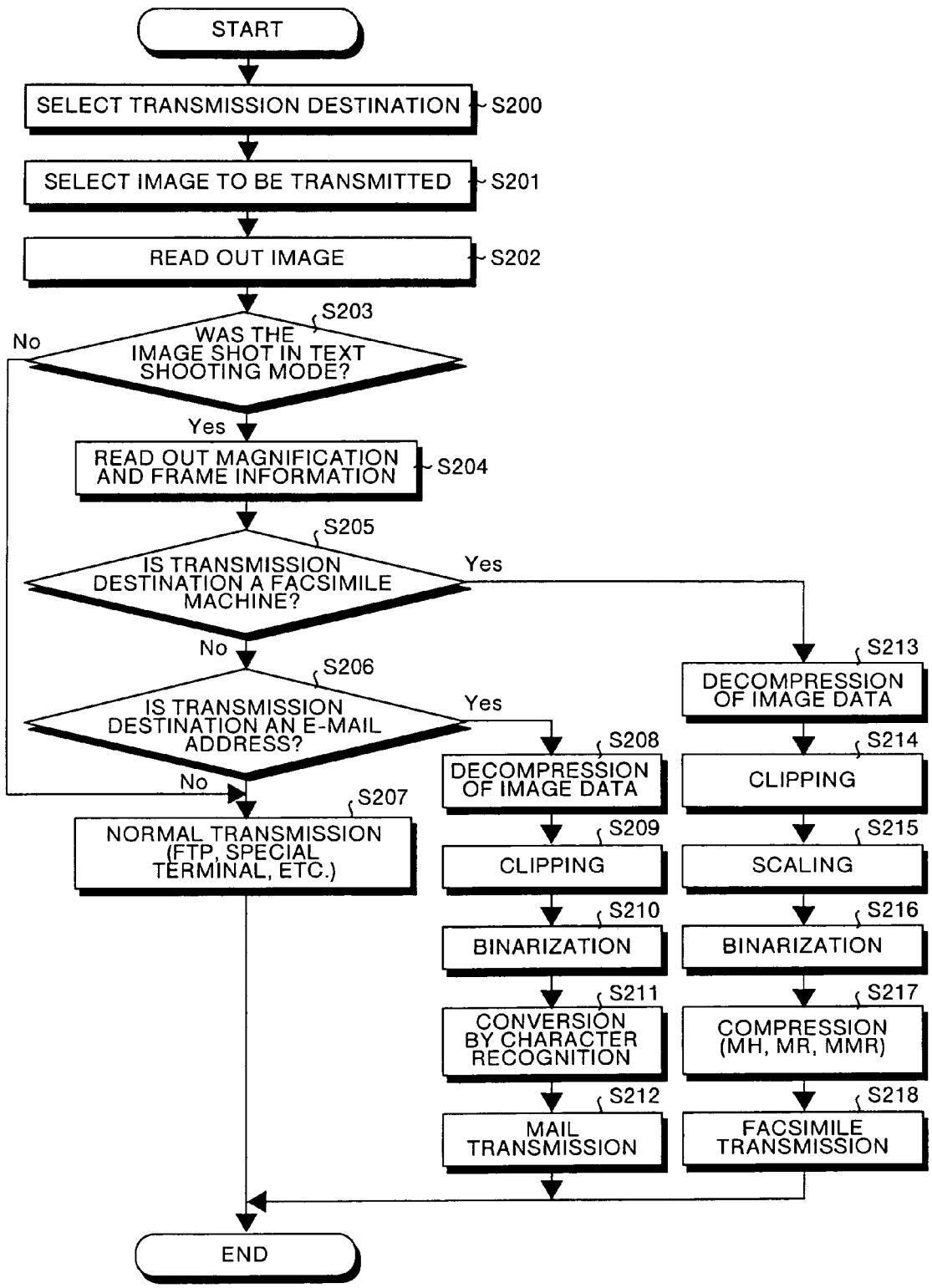
FIG. 6 shows a flowchart detailing an operation when transferring a shot image to an external device in the first embodiment.

Next, an operation to transfer the shot image to an external device will be explained with reference to FIG. 6. FIG. 6 shows a flowchart detailing an operation when transferring a shot image to an external device.

In the drawing, the user initially manipulates the operation unit 109, and selects the transmission destination and an image to be transmitted (Steps S200 and S201). Then, the system control unit 101 reads out the selected compressed image data from the recording media 107 (Step S202), and checks the shooting mode set at the shooting from the header information appended to the image and determines whether the image was shot in the text shooting mode or not (Step S203). When it is judged that the image was shot in the mode other than the text shooting mode, the system control unit 101 skips to Step S207, whereby the image data is transmitted intact by employing a protocol appropriate to the transmission destination.

On the other hand, when it is judged that the image was shot in the text shooting mode in Step S203, the system control unit 101 reads out the file that has recorded the shooting magnification, the kind of a frame recorded at the shooting from the recording media 107 (Step S204). Then, the system control unit 101 checks whether the attribute of the transmission destination indicates a facsimile machine or not (Step S205). When the attribute of the transmission destination indicates a facsimile machine, the system control unit 101 proceeds to Step S213, and transfers the read out compressed image data to the image processing unit 103, which accordingly decompresses the compressed image data and effects clipping (Step S214). By effecting the clipping, an area unambiguously determined by the kind of a frame that has been read out beforehand is cut out and processed (see FIG. 4).

Next, the image processing unit 103 effects scaling (Step S215). Herein, the image processing unit 103 uses the shooting magnification that has been read out beforehand, and converts the size to an approximation to the actual size of the shot text. To be more specific, when the shot text is of the ISO size A4, the effecting is effected in such a manner that the image data is transmitted as a text of the ISO size A4. Likewise, when the shot text is of the ISO size A3, the scaling is effected in such a manner that the image data is transmitted as a text of the ISO size A3. In this case, resolution is changed to the predetermined resolution for a facsimile communication.

Further, the image processing unit 103 effects binarization (Step S216). The binarization can be effected with the method disclosed in, for example, Japanese Patent Application Laid-Open (JP-A) No. 8-125870 supra. Subsequently, the image processing unit 103 compresses the resulting binary image data again by the compressing method adapted to the facsimile transmission (Step S217). Here, a method (MH, NR, MMR, etc.) determined by a negotiation at the commencement of the communication is employed as the compressing method. Then, the system control unit 101 transmits the recompressed image data to the facsimile machine through the communication interface unit 110 (Step S218), whereupon the procedure is completed.

On the other hand, when the attribute of the transmission destination does not indicate a facsimile machine in Step S205, the system control unit 101 proceeds to Step S206, and checks whether the attribute of the transmission destination indicates an e-mail or not. When the attribute of the transmission destination indicates an e-mail, the image processing unit 103 effects the decompression, clipping, and binarization to the compressed image data (Steps S208 to S210) in the same manner as was in the facsimile transmission. Then, the image processing unit 103 converts the image data into a text document by means of character recognition (Step S211).

Then, the system control unit 101 edits the converted text as a content of the e-mail, and transmits the same to the transmission destination through the communication interface unit 110 (Step S212), whereupon the procedure is completed. Also, when the attribute of the transmission destination does not indicate an e-mail, the image data is transmitted intact by employing a protocol appropriate to the transmission destination (Step S207).

According to the above operation example, the image processing unit 103 converts an image shot in the text shooting mode into a data format appropriate to the transmission destination (a facsimile machine, a personal computer, etc.) selected by the user. Consequently, an image shot in the text shooting mode can be converted into a format suitable to the transmission destination, thereby making it possible to efficiently utilize the shot image.

Also, according to the above operation example, when transmitting an image shot in the text shooting mode to a facsimile machine, the image processing unit 103 decompresses the compressed image data stored in the recording media 107 followed by the clipping, binarization (small-step gray scaling), resolution changing, etc., and recompresses the image data by the compressing method adapted to the facsimile transmission. Consequently, the image data can be converted to an image suitable to the facsimile machine, thereby making it possible to efficiently utilize the shot image.

Also, according to the above operation example, when transmitting an image shot in the text shooting mode, the image processing unit 103 decompresses the compressed image data stored in the recording media 107 followed by the clipping, binarization (small-step gray scaling), etc., and converts the image data into a text document (text data) by means of character recognition. Consequently, the image data can be converted into a data format appropriate to an e-mail, thereby making it possible to efficiently utilize the shot image.

Figure 7:
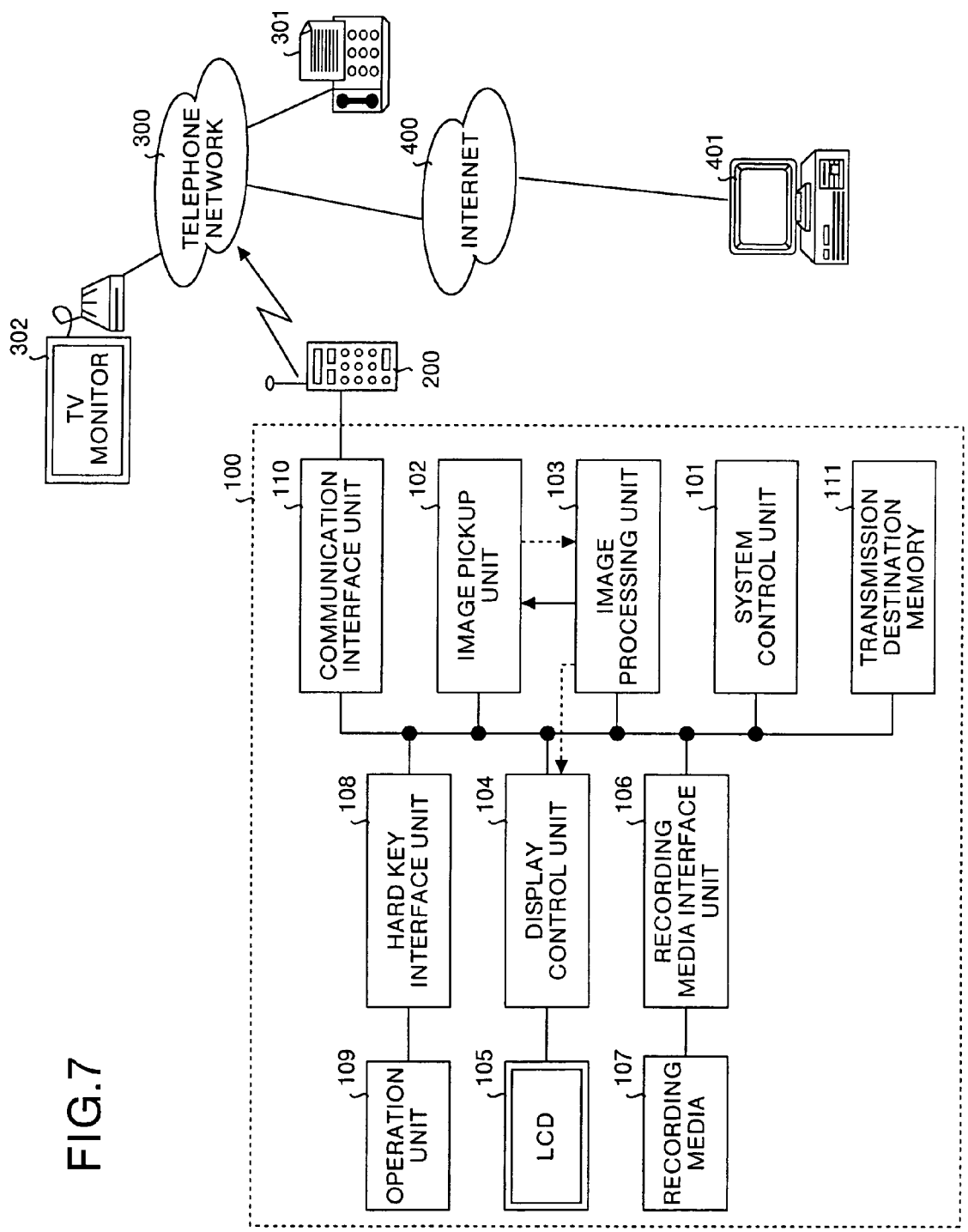
FIG. 7 is a view depicting an arrangement of a digital camera of a second embodiment.

Next, a digital camera of a second embodiment will be explained with reference to FIG. 7 to FIG. 10. FIG. 7 is a block diagram depicting an arrangement of the digital camera of the second embodiment. In the drawing, like components are labeled with like numerals with respect to the digital camera of the first embodiment shown in FIG. 1. The digital camera of the second embodiment shown in FIG. 7 is identical with its counterpart in the first embodiment except that a transmission destination memory 111 is additionally provided. Because the arrangement other than the transmission destination memory 111 is the same as that in the first embodiment, the explanation of the same arrangement is omitted, and the explanation will be given only to the different arrangement.

FIG. 8 is a view showing an example of a data structure in the transmission destination memory 111. The transmission destination memory 111 is composed of a non-volatile memory, and manages information as to destinations used in transmitting the image data. As shown in the drawing, the transmission destination memory 111 stores information including the name of the destination, the type of the destination, telephone number, an e-mail address, guidance frame display information, a document size, an image deleting flag, etc. for each destination in one-to-one correspondence.

The guidance frame display information referred to herein specifies whether a frame of a regular size should be displayed on the LCD 105 in response to the text size for convenience of the shooter during the shooting in the text shooting mode. When the guidance frame display information indicates a value "1", the guidance frame is displayed, and when the guidance frame display information indicates a value "0", the guidance frame is not displayed. The document size referred to herein determines the size of the guidance frame when it is displayed. The image deleting flag referred to herein specifies whether the image data should be deleted from the recording media 107 or not after the image data is transmitted to the destination the manipulator has selected. When the image deleting flag indicates a value "1", the transmitted image data is deleted, and when the image deleting flag indicates a value "0", the transmitted image data is not deleted and saved intact. The contents of the data in the transmission destination memory 111 can be displayed on the LCD 105, and the manipulator can register the data content on the LCD 105 by manipulating the manipulation unit.

Figure 9:
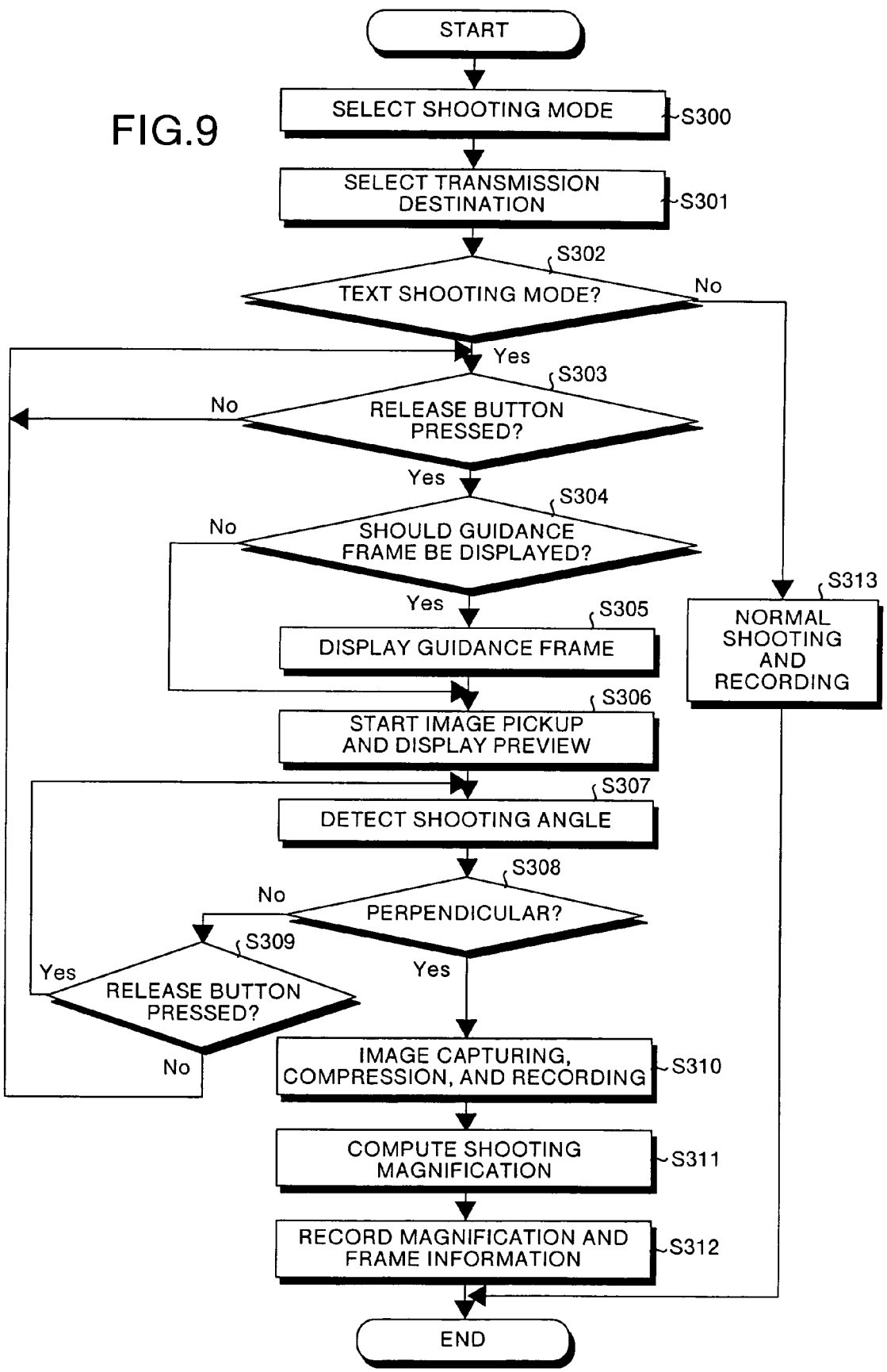
FIG. 9 shows a flowchart detailing a shooting operation when the text shooting mode is selected in the second embodiment.

FIG. 9 shows a flowchart detailing a shooting operation in the second embodiment. The manipulator initially selects a desired shooting mode by manipulating the operation unit 109 (Step S300), and selects a destination among those registered in the transmission destination memory 111 (Step S301).

The system control unit 101 distinguishes the current shooting mode (Step S302), and when it is judged that the current shooting mode is not the text shooting mode but the normal shooting mode, the system control unit 101 proceeds to Step S313 and effects the normal shooting and recording.

On the other hand, when it is judged that the current shooting mode is the text shooting mode in Step S302, the system control unit 101 monitors the key information from the hard key interface unit 108, and upon judging that the release button is pressed down (Step S303), the system control unit 101 checks whether the guidance frame display is specified or not with reference to the guidance frame display information in the transmission destination memory 111 for the selected destination (Step S304). When the guidance frame display is not specified, the system control unit 101 skips to Step S306.

When the guidance frame display is specified in Step S304, the system control unit 101 displays a guidance frame such as the one shown in FIG. 4 (Step S305), and starts the image pickup to display a preview image in the manner described above (Step S306). A display example of the guidance frame is the same as that shown in FIG. 4.

The display of the guidance frame is the same as that described in the first embodiment, and the explanation thereof is omitted herein. The frames are displayed herein in accordance with a regular size aspect ratio equivalent to the document size for the destination stored in the transmission destination memory 111 as previously mentioned.

Subsequently, the system control unit 101 sets the image processing unit 103 to detect the shooting angle, in response to which the image processing unit 103 detects the shooting angle, whereupon the system control unit 101 reads in the detected shooting angle (Step S307). Then, the system control unit 101 checks whether the shooting angle is perpendicular or not (Step S308). Here, the detecting method of the shooting angle is the same as the one described in the first embodiment (see FIG. 5A and FIG. 5B), and the explanation thereof is omitted herein.

Meanwhile, when it is judged that the shooting angle is not perpendicular in Step S308, the system control unit 101 proceeds to Step S309, and checks whether or not the release button is pressed down. When the release button is not pressed down, the system control unit 101 returns to Step S303. On the other hand, when the release button is pressed down, the system control unit 11 notifies the manipulator that the shooting angle is not perpendicular (by means of guidance display or the like), for example, and detects the shooting angle again (Step S307).

On the other hand, when it is judged that the shooting angle is perpendicular in Step S308, the system control unit 101 controls the image pickup unit 102 to capture the image data and the image processing unit 103 to compress the captured image data in the same manner when the release button is pressed down in the normal shooting mode, after which the system control unit 101 records the compressed image data into the recording media 107 through the recording media interface unit 106 (Step S310).

Further, the system control unit 101 reads out from the image processing unit 103 a lens-to-subject distance (a distance from the digital camera to the text) detected by means of focusing at the shooting, and computes a shooting magnification (a focal length of the lens/lens-to-subject distance) (Step S311), which is recorded into the recording media 107 in a one-to-one correspondence with the shot image together with the information related to the kind of a frame (Step S312). If the guidance frame was not displayed in Step S304, the frame information is not recorded. In the above flow, if "Taro Yamamoto" in the transmission destination memory 111 shown in FIG. 8 is selected as the destination, because the guidance frame display information indicates a value "1" and the document size indicates the ISO size A4, the guidance frame equivalent to the ISO size A4 will be displayed.

As explained above, in the second embodiment, the guidance frame display information that specifies whether the guidance frame should be displayed or not is stored in the transmission destination memory 111 in a one-to-one correspondence with a destination, and in the text shooting mode, display and non-display of the guidance frame is controlled in accordance with the guidance frame display information for the selected destination with reference to the transmission destination memory 111. Consequently, display and non-display of the guidance frame is controlled for each transmission destination, thereby making the operation more convenient to the manipulator.

In the second embodiment, the system control unit 101 determines whether the guidance frame should be displayed or not in accordance with the frame display information stored in the transmission destination memory 111. It should be appreciated, however, that the system control unit 101 may automatically determine whether the guidance frame should be displayed or not in accordance with the attribute of the destination. For example, in case that the type of the destination indicates a printer, the shot image should be contained within in a specific paper size, such as the ISO size A4, and therefore, the system control unit 101 displays the guidance frame, whereas in case that the type of the destination indicates a PC, the shot image does not have to be contained within in a specific paper size, and the system control unit 101 may not display the guidance frame.

Figure 10:
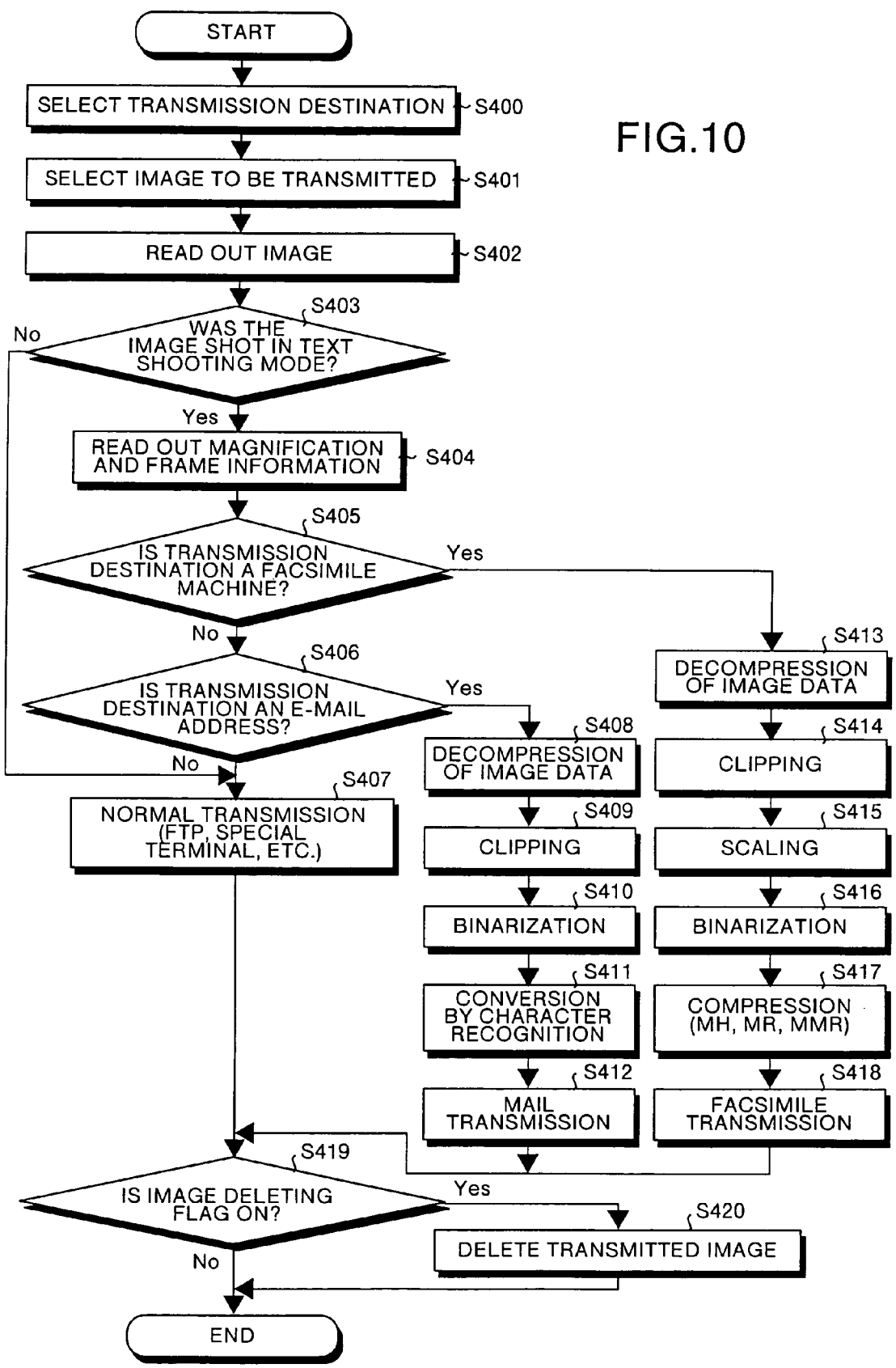
FIG. 10 shows a flowchart detailing an operation when transferring a shot image to an external device in the second embodiment.

Next, the following operation will describe an operation during a communication in the second embodiment. FIG. 10 shows a flowchart detailing an operation during a communication in the second embodiment.

In the drawing, the user initially selects a destination among those registered in the transmission destination memory 111 (Step S400), and selects an image to be transmitted (Step S401). Then, the system control unit 101 reads out the selected image data from the recording media 107 (Step S402), and distinguishes the shooting mode at the shooting from the header information appended to the image to determine whether the image was shot in the text shooting mode or not (Step S403). When it is judged that that the image was shot in the mode other than the text shooting mode, the system control unit 101 proceeds to Step S407, whereby the image data is transmitted intact to the transmission destination through the communication interface unit 110 by employing a protocol appropriate to the transmission destination.

On the other hand, when it is judged that the image was shot in the text shooting mode in Step S403, the system control unit 101 reads out the file that has stored the shooting magnification and the kind of a frame recorded at the shooting from the recording media 107 (Step S404). Herein, when the guidance frame was not displayed at the shooting, the kind of a frame is not recorded. Then, the system control unit 101 checks whether the attribute of the transmission destination indicates a facsimile machine or not (Step S405). When the attribute of the transmission destination indicates a facsimile machine, the system control unit 101 proceeds to Step S413, and transfers the read out compressed image data to the image processing unit 103, which accordingly decompresses the compressed image data and effects clipping (Step S414). By effecting the clipping, an area unambiguously determined by the kind of a frame that has been read out beforehand is cut out and processed. When the kind of a frame is not recorded, the clipping is not effected.

Next, the image processing unit 103 effects scaling (Step S415). Herein, the image processing unit 103 uses the shooting magnification that has been read out beforehand, and converts the size to an approximation to the actual size of the shot text. To be more specific, when the shot text is of the ISO size A4, the scaling is effected in such manner that the image data is transmitted as a text of the ISO size A4. Likewise, when the shot text is of the ISO size A3, the scaling is effected in such a manner that the image data is transmitted as a text of the ISO size A3. In this case, resolution is changed to the predetermined resolution for a facsimile communication.

Further, the image processing unit 103 effects binarization (Step S416). The binarization can be effected with the method disclosed in, for example, Japanese Patent Application Laid-Open (JP-A) No. 6-256907. Subsequently, the image processing unit 103 compresses the resulting binary image data again by the compressing method adapted to the facsimile transmission (Step S417). Here, a method (MH, NR, MMR, etc.) determined by a negotiation at the commencement of the communication is employed as the compressing method. Then, the system control unit 101 transmits the recompressed image data to the facsimile machine through the communication interface unit 110 (Step S418), whereupon the procedure is completed.

On the other hand, when the attribute of the transmission destination does not indicate a facsimile machine in Step S405, the system control unit 101 proceeds to Step S406, and checks whether the attribute of the transmission destination indicates an e-mail or not. When the attribute of the transmission destination indicates an e-mail, the image processing unit 103 effects the decompression, clipping, and binarization on the compressed image data (Steps S408 to S410) in the same manner as was in the facsimile transmission. When the kind of a frame is not recorded, the clipping is not effected.

Subsequently, the image processing unit 103 converts the image data into a text document by means of character recognition (Step S411). Then, the system control unit 101 edits the converted text document as a content of the e-mail, and transmits the same to the destination through the communication interface unit 110 (Step S412), whereupon the procedure is completed.

Also, when the attribute of the transmission destination does not indicate an e-mail in Step 406, the image data is transmitted intact by employing a protocol appropriate to the transmission destination (Step S407).

Then, the system control unit 101 refers to the transmission destination memory 111, an checks whether a value "1" is set to the image deleting flag for the destination or not (Step S419). When a value "1" is set to the image deleting flag for the destination, the system control unit 101 deletes the transmitted image file from the recording media 107 (Step S420). On the other hand, when a value "0" is set to the image deleting flag, the system control unit 101 does not delete the image file that has been transmitted and saves the same intact, whereupon the procedure is completed. In the above flow, for example, when "Taro Yamamoto" is selected as the destination from the transmission memory 111 shown in FIG. 8, because a value "1" is set to the image deleting flag, the image file that has been transmitted is deleted.

As explained above, in the second embodiment, the image deleting flag that specifies whether the transmitted image file should be deleted or not is stored in the transmission destination memory 111 in a one-to-one correspondence with a destination, and in the text shooting mode, the transferred image file is deleted in accordance with the image deleting flag for the selected destination with reference to the transmission destination memory 111. Consequently, a transferred image can be deleted or saved intact depending on a transmission destination, thereby making the operation more convenient to the manipulator.

In the second embodiment, the system control unit 101 determines whether the transmitted image file should be deleted or not in accordance with the image deleting flag for each destination stored in the transmission memory 111. It should be appreciated, however, that the system control unit 101 may automatically determine whether the transmitted image file should be deleted or not in accordance with the type of a destination. For example, in case that the type of a destination indicates a facsimile machine, because the facsimile machine returns a response upon acceptance of the image, it is judged that there will be no problem if the image is deleted, and the system control unit 101 deletes the image file. On the other hand, in case that the type of a destination indicates a PC, because the PC does not return any response upon acceptance of the image, if the image is deleted, the image will be lost should the transmission have failed. Thus, it is judged that deleting the image file may raise a problem, and the system control unit 101 may not delete the image file.

Next, a digital camera of a third embodiment will be explained with reference to FIG. 11 and FIG. 12. The digital camera of the third embodiment is of the same arrangement as that of its counterpart in the first embodiment. However, the digital camera of the third embodiment (system control unit 101) additionally has a shooting and transferring mode, in which an image is transmitted to the specified destination as soon as it is shot.

When the user wishes to transmit an image to an external device as soon as it is shot in the text shooting mode, the user manipulates the operation unit 109 to select the shooting and transferring mode and the text shooting mode with the shooting mode key. Also, the user selects a desired regular document size (the ISO size A, letter size, legal size, etc.) for an image to be captured with the regular document size setting key, and selects the destination.

Figure 11:
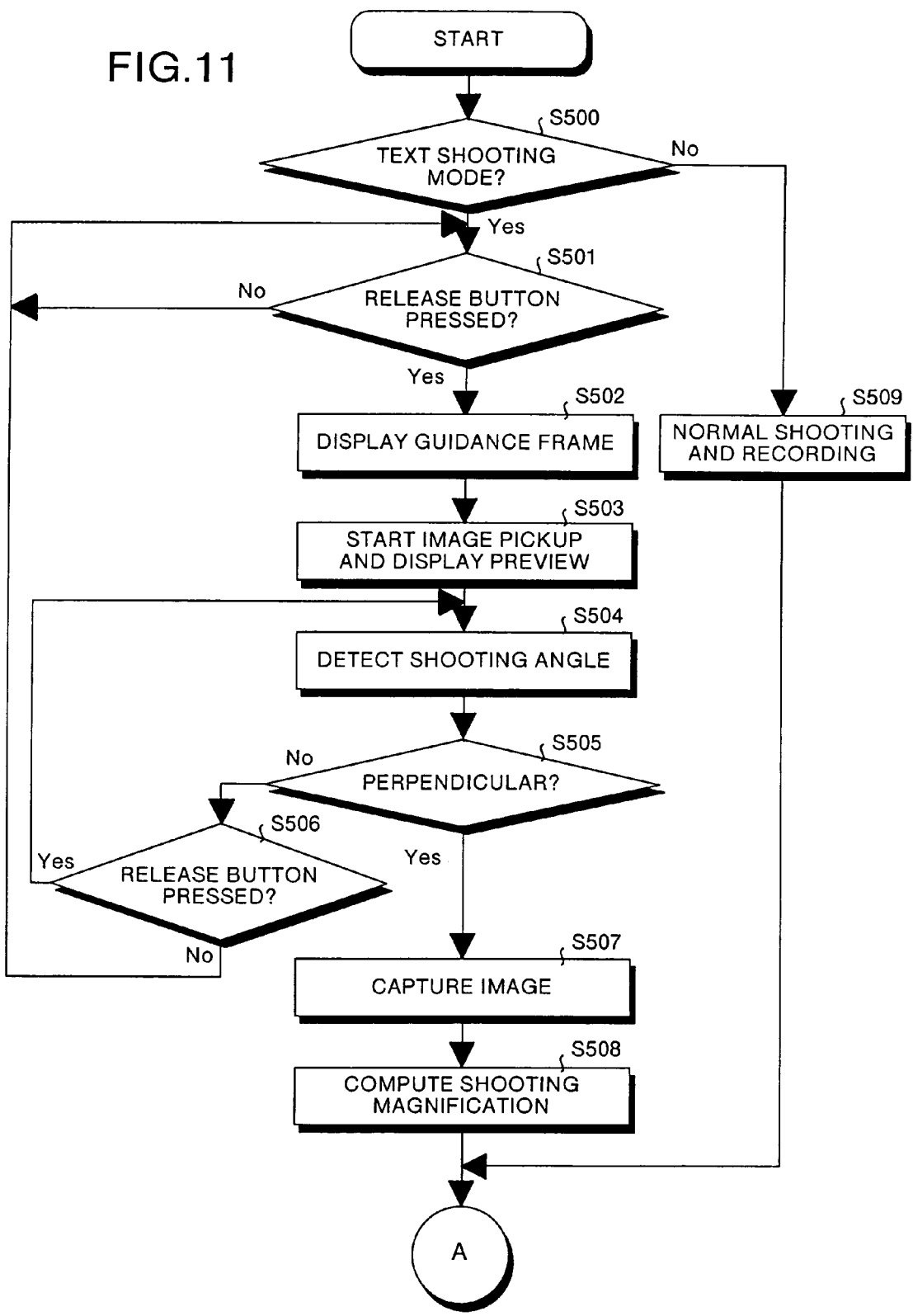
FIG. 11 shows a flowchart detailing an operation when a text shooting and transferring mode is selected in a third embodiment.

In FIG. 11, the system control unit 101 initially distinguishes the current shooting mode (Step S500), and when it is judged that the current shooting mode is the normal shooting mode, the system control unit 101 proceeds to Step S509 and effects the normal shooting and recording.

On the other hand, when it is judged that the current shooting mode is the text shooting mode in Step S500, the system control unit 101 monitors the key information from the hard key interface unit 108, and upon judging that the release button is pressed down (Step S501), the system control unit 101 displays on the LCD 105 a guidance frame such as the one shown in FIG. 4 (Step S502), and starts the image pickup to display a preview image (display the subject on the monitor) in the manner described as above (Step S503). A display example of the guidance frame is the same as that in the first example (FIG. 4).

Subsequently, the system control unit 101 specifies the image processing unit 103 to detect the shooting angle with respect to the subject (text), in response to which the image processing unit 103 detects the shooting angle, whereupon the system control unit 101 reads in the detected shooting angle (Step S504). Then, the system control unit 101 checks whether the shooting angle is perpendicular or not (Step S505). Here, the detecting method of the shooting angle is the same as the one described in the first embodiment (see FIG. 5A and FIG. 5B), and the explanation thereof is omitted herein.

Meanwhile, when it is judged that the shooting angle is not perpendicular in Step S505, the system control unit 101 proceeds to Step S506, and checks whether the release button is pressed down or not. When the release button is not pressed down, the system control unit 101 returns to Step S501. On the other hand, when the release button is pressed down, the system control unit 101 notifies the manipulator that the shooting angle is not perpendicular (by means of guidance display or the like), for example, and detects the shooting angle again (Step S504).

On the other hand, when it is judged that the shooting angle is perpendicular instep S505, the system control unit 101 controls the image pickup unit 102 to capture the image data in the same manner when the release button is pressed down in the normal shooting mode (Step S507). Further, the system control unit 101 reads out from the image processing unit 103 a lens-to-subject distance (a distance from the digital camera 100 to the text (text subject to shooting)) detected by means of focusing at the shooting, and computes a shooting magnification (a focal length of the lens/lens-to-subject distance) (Step S508).

In FIG. 12, the system control unit 101 checks whether the image was shot in the text shooting mode or not (Step S511), and when it is judged that the image was shot in the mode other than the text shooting mode, the system control unit 101 proceeds to Step S514, and transmits the image data intact to the transmission destination by employing a protocol appropriate to the transmission destination through the communication interface unit 110.

On the other hand, when it is judged that the image was shot in the text shooting mode, the system control unit 101 checks whether the attribute of the transmission destination indicates a facsimile machine (Step S512). When the attribute of the transmission destination indicates a facsimile machine, the system control unit 101 proceeds to Step S519 and effects clipping. By effecting the clipping, an area unambiguously determined by the kind of a frame that has been read out beforehand is cut out and processed.

Next, the image processing unit 103 effects scaling (Step S520). Herein, the image processing unit 103 uses the shooting magnification, and converts the size to an approximation to the actual size of the shot text. To be more specific, when the shot text is of the ISO size A4, the scaling is effected in such a manner that the image data is transmitted as a text of the ISO size A4. Likewise, when the shot text is of the ISO size A3, the scaling is effected in such a manner that the image data is transmitted as a text of the ISO size A3. In this case, resolution is changed to the predetermined resolution for a facsimile communication.

Further, the image processing unit 103 effects binarization (Step S521). The binarization can be effected with the method disclosed in, for example, Japanese Patent Application Laid-Open (JP-A) No. 8-125870 supra. Subsequently, the image processing unit 103 compresses the resulting binary image data again by the compressing method adapted to the facsimile transmission (Step S522). Here, a method (MH, NR, MMR, etc.) determined by a negotiation at the commencement of the communication is employed as the compressing method. Then, the system control unit 101 transmits the recompressed image data to the facsimile machine through the communication interface unit 110 (Step S523), whereupon the procedure is completed.

On the other hand, when the attribute of the transmission destination does not indicate a facsimile machine in Step S512, the system control unit 101 proceeds to Step S513, and checks whether the attribute of the transmission destination indicates an e-mail or not. When the attribute of the transmission destination indicates an e-mail, the image processing unit 103 effects the clipping and binarization to the compressed image data in the same manner as was with the facsimile transmission (Steps S515 and S516). Then, the image processing unit 103 converts the image data into a text document by means of character recognition (Step S517).

Then, the system control unit 101 edits the converted text document as a content of the e-mail, and transmits the same to the destination through the communication interface unit 110 (Step S518), whereupon the procedure is completed. Also, when the attribute of the transmission destination does not indicate an e-mail in Step S513, the image data is transmitted intact by employing a protocol appropriate to the transmission destination (Step S514).

As explained above, the third embodiment is additionally provided with the text shooting and transferring mode, in which an image is transferred as soon as it is shot. Consequently, it is possible to transmit an image to a desired destination as soon as it is shot, thereby making the operation more convenient to the manipulator.

Further, the camera according to the third embodiment may be provided with the transmission destination memory 111 (see FIG. 8) of the second embodiment, so that display and non-display of the guidance frame is controlled in accordance with the guidance frame display information stored in the transmission destination memory 111 for each destination. Alternatively, display and non-display of the guidance frame may be controlled automatically in accordance with the attribute of the destination.

In addition, the third embodiment may be provided with the transmission destination memory 111 (see FIG. 8) of the second embodiment, so that a transmitted image file is deleted in accordance with the image deleting flag in the transmission destination memory 111 for each destination. Alternately, the transmitted image file may be automatically deleted in accordance with the attribute of the destination.

The present invention is not limited to the above described embodiment, but it is to be understood that changes and variations may be made without departing from the spirit or scope of the following claims.

Thus, according to the digital camera of one aspect of the present invention, after the decompressing unit decompresses the compressed image data of an image captured in the text shooting mode and stored in the storage unit, the image processing unit effects image processing appropriate to a transmission destination to resulting decompressed image data. Consequently, the image captured in the text shooting mode can be converted into a format suitable to the transmission destination, thereby making it possible to utilize the captured image efficiently.

According to the digital camera of another aspect of the present invention, the image processing unit effects image processing appropriate to a transmission destination to the image data of an image captured in the text shooting mode. Consequently, the image captured in the text shooting mode can be converted into a format suitable to the transmission destination, thereby making it possible to utilize the captured image efficiently.

According to the digital camera of still another aspect of the present invention, after the decompressing unit decompresses the compressed image data of an image captured in the text shooting mode and stored in the storage unit, the image processing unit effects processing including clipping, small-step gray scaling, and resolution changing to resulting decompressed image data, and further recompresses resulting processed image data. Consequently, the image captured in the text shooting mode can be converted into a format suitable to the transmission destination (for example, a facsimile machine), thereby making it possible to utilize the captured image efficiently.

According to the digital camera of still another aspect of the present invention, the image processing unit effects image processing including clipping, small-step gray scaling, and resolution changing to the image data of an image captured in the text shooting mode, and further compresses resulting processed image data. Consequently, the image captured in the text shooting mode can be converted into a format suitable to the transmission destination (for example, a facsimile machine), thereby making it possible to utilize the captured image efficiently.

According to the digital camera of still another aspect of the present invention, after the decompressing unit decompresses the compressed image data of an image captured in the text shooting mode and stored in the storage unit, the image processing unit effects processing including clipping and small-step gray scaling to resulting decompressed image data, and further effects data processing by means of character recognition to resulting processed image data. Consequently, the image captured in the text shooting mode can be converted into a format (for example, a text document) suitable to the transmission destination, thereby making it possible to utilize the captured image efficiently.

According to the digital camera of still another aspect of the present invention, the image processing unit effects processing including clipping and small-step gray scaling to the image data of an image captured in the text shooting mode, and further effects data processing by means of character recognition to resulting processed image data. Consequently, the image captured in the text shooting mode can be converted into a format (for example, a text document) suitable to the transmission destination, thereby making it possible to utilize the captured image efficiently.

Furthermore, the storage unit stores shooting condition data in a one-to-one correspondence with the compressed image data, and the image processing unit effects the image processing to the image data based on the shooting condition data. Consequently, an additional effect that the image processing appropriate to the transmission destination can be readily effected by using the shooting condition data.

Furthermore, a data communication unit which allows a data communication with an external device is additionally provided. Consequently, an additional effect that a data communication with an external device is allowed by the data communication unit.

Furthermore, name, telephone number or address of a destination, and an image deleting flag that specifies whether the image data should be deleted or not after transmission are stored in the memory in a one-to-one correspondence, and the deleting unit deletes the image data that has been transmitted through the data communication unit in accordance with the image deleting flag stored in the memory. Consequently, an additional effect that deletion and non-deletion of the transferred image can be controlled depending on a transmission destination, thereby making the operation more convenient to the manipulator.

Furthermore, the deleting unit deletes the image data that has been transmitted through the data communication unit depending on a transmission destination. Consequently, an additional effect that deletion and non-deletion of the transferred image can be controlled depending on a transmission destination, thereby making the operation more convenient to the manipulator.

According to the digital camera of still another aspect of the present invention, in the text shooting mode, the display unit displays guidance to notify a shooting condition of a text while displaying on the monitor the video of the subject before being shot. Consequently, the user can fix the position of the text, thereby making the operation more convenient to the user.

According to the digital camera of still another aspect of the present invention, in the text shooting mode, the display unit displays guidance to notify a shooting condition of a text while displaying on the monitor the video of the subject before being shot. Consequently, the user can fix the position of the text, thereby making the operation more convenient to the user.

Furthermore, a frame is displayed as the guidance to make a user aware of an area of a regular size sheet. Consequently, an additional effect that the user can fix the position of the text within the regular size sheet, thereby making the operation more convenient to the user.

According to the digital camera of still another aspect of the present invention, a shooting angle detecting unit which detects a shooting angle is provided, and in the text shooting mode, shooting is started when the shooting angle becomes substantially perpendicular. Consequently, it is possible to shoot the text at the correct angle, thereby making the operation more convenient to the user.

According to the digital camera of still another aspect of the present invention, a shooting angle detecting unit which detects a shooting angle is provided, and in the text shooting mode, shooting is started when the shooting angle becomes substantially perpendicular. Consequently, it is possible to shoot the text at the correct angle, thereby making the operation more convenient to the user.

Furthermore, the shooting angle detecting unit detects the shooting angle by recognizing a shape of the subject being shot. Consequently, an additional effect that the correct shooting angle can be detected regardless of the state of the text subject to shooting, and the shooting angle can be detected by a simple and inexpensive arrangement.

Furthermore, name, telephone number or address of a destination, and frame display information that specifies whether or not guidance should be displayed during shooting are stored in the memory in a one-to-one correspondence, and the display unit controls display and non-display of the guidance in accordance with the frame display information stored in the memory. Consequently, an additional effect that display and non-display of the guidance can be controlled depending on a transmission destination, thereby making the operation more convenient to the manipulator.

Furthermore, the display unit controls display and non-display of the guidance on the display unit depending on a transmission destination. Consequently, an additional effect that display and non-display of the guidance can be controlled depending on a transmission destination, thereby making the operation more convenient to the manipulator.

Furthermore, a manipulator is allowed to arbitrarily set a content of the memory. Consequently, an additional effect that the operation can be more convenient to the manipulator.

According to the method of shooting an transferring text using a digital camera of still another aspect of the present invention, a subject is monitored through a display unit at a monitoring command; guidance is displayed on the display unit during the monitoring; image data is captured and compressed at a shooting command; compressed image data is stored in storage unit; the compressed image data stored in the storage unit is read out and decompressed at a transmission command; image processing appropriate to a transmission destination is effected to the decompressed image data; and the image data to which the image processing has been effected is transferred to the transmission destination. Consequently, the image can be transferred after it is converted into a format suitable to the transmission destination, thereby making it possible to utilize the captured image efficiently.

According to the method of shooting an transferring text using a digital camera of still another aspect of the present invention, a subject is monitored through a display unit at a monitoring command; guidance is displayed on the display unit during the monitoring; image data is captured at a shooting command; image processing appropriate to a transmission destination is effected to captured image data; and the image data to which the image processing has been effected is transferred to the transmission destination. Consequently, the image can be transferred immediately after it is converted into a format suitable to the transmission destination, thereby making it possible to utilize the captured image efficiently.

The present document incorporates by reference the entire contents of Japanese priority documents, 2000-012217 filed in Japan on Jan. 20, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera having a normal shooting mode and a text shooting mode, comprising:
   an image pickup unit which captures an image of a subject and converts the image into image data;
   a switching unit which switches the normal shooting mode to the text shooting mode and vice versa;
   a display unit which displays on a monitor a video of the subject before being shot;
   a transmission destination unit which selects a destination to transmit the image data to, said destination being one of a facsimile machine or an email address;
   a memory which stores, in a one-to-one correspondence, name, telephone number, or address of a destination, and frame display information that specifies whether guidance should be displayed during shooting;
   an image processing unit which performs processing including at least one of clipping and small-step gray scaling to the image data of an image captured in the text shooting mode, and further effecting data processing by means of character recognition to resulting processed image data, the image processing being different for the email address and the facsimile machine, wherein
   the image processing unit detects a shooting angle of the digital camera with respect to the subject,
   in the text shooting mode, the memory stores shooting condition data in a one-to-one correspondence along with the image data, and the image processing unit effects the image processing to the image data based on said shooting condition data, and
   said display unit controls display and non-display of the guidance on said monitor in accordance with said frame display information stored in said memory.

2. The digital camera according to claim 1, further comprising a data communication unit which allows a data communication with an external device.

3. The digital camera according to claim 2, further comprising a deleting unit which deletes the image data that has been transmitted through said data communication unit depending on a transmission destination.

4. The digital camera according to claim 1, wherein
the memory stores an image deleting flag that specifies whether the image data should be deleted or not after transmission in a one-to-one correspondence; and the digital camera further comprises
a deleting unit which deletes the image data that has been transmitted through said data communication unit in accordance with the image deleting flag stored in said memory.

5. The digital camera according to claim 4, wherein a manipulator is allowed to arbitrarily set a content of said memory.

6. The digital camera according to claim 1, wherein a manipulator is allowed to arbitrarily set a content of said memory.

7. A digital camera having a normal shooting mode and a text shooting mode, comprising:
an image pickup unit which captures an image of a subject and converts the image into image data;
a compressing unit which generates compressed image data by compressing the image data outputted from said image pickup unit;
a storage unit which stores the compressed image data;
a switching unit which switches the normal shooting mode to the text shooting mode and vice versa; and
a display unit which displays on a monitor a video of the subject before being shot,
wherein, in the text shooting mode, said display unit displays guidance to notify a shooting condition of a text while displaying on the monitor the video of the subject before being shot, and
said display unit controls display and non-display of the guidance on said monitor depending on a transmission destination.

8. The digital camera according to claim 7, wherein the guidance includes a frame displayed to make a user aware of an area of a regular size sheet.

9. A digital camera having a normal shooting mode and a text shooting mode, comprising:
an image pickup unit which captures an image of a subject and converts the image into image data;
a switching unit which switches the normal shooting mode to the text shooting mode and vice versa; and
a display unit which displays on a monitor a video of the subject before being shot,
wherein, in the text shooting mode, said display unit displays guidance to notify a shooting condition of a text while displaying on the monitor the video of the subject before being shot, and
said display unit controls display and non-display of the guidance on said monitor depending on a transmission destination.

10. The digital camera according to claim 9, wherein the guidance includes a frame displayed to make a user aware of an area of a regular size sheet.

11. The digital camera according to claim 9, further comprising:
a memory which stores, in a one-to-one correspondence, name and/or telephone number and/or address of a destination, and frame display information that specifies whether or not the guidance should be displayed during shooting,
wherein said display unit controls display and non-display of the guidance in accordance with said frame display information stored in said memory.

12. The digital camera according to claim 11, wherein a manipulator is allowed to arbitrarily set a content of said memory.

13. A digital camera having a normal shooting mode and a text shooting mode, comprising:
an image pickup unit which captures an image of a subject and converts the image into image data;
a compressing unit which generates compressed image data by compressing the image data outputted from said image pickup unit;
a storage unit which stores the compressed image data;
a switching unit which switches the normal shooting mode to the text shooting mode and vice versa; and
a shooting angle detecting unit which detects a shooting angle of the digital camera with respect to the subject,
wherein, in the text shooting mode, shooting is started when the shooting angle of the digital camera with respect to the subject becomes substantially perpendicular.

14. The digital camera according to claim 13, wherein said shooting angle detecting unit detects the shooting angle by recognizing a shape of the subject being shot.

15. A digital camera having a normal shooting mode and a text shooting mode, comprising:
an image pickup unit which captures an image of a subject and converts the image into image data;
a switching unit which switches the normal shooting mode to the text shooting mode and vice versa; and
a shooting angle detecting unit which detects a shooting angle of the digital camera with respect to the subject,
wherein, in the text shooting mode, shooting is started when the shooting angle of the digital camera with respect to the subject becomes substantially perpendicular.

16. The digital camera according to claim 15, wherein said shooting angle detecting unit detects the shooting angle by recognizing a shape of the subject being shot.

17. A method of shooting a transferring text using a digital camera, comprising:
monitoring a subject through a display unit at a monitoring command;
displaying guidance on said display unit during the monitoring;
capturing and compressing image data at a shooting command;
storing compressed image data in storage unit;
reading out and decompressing the compressed image data stored in said storage unit at a transmission command;
effecting image processing appropriate to a transmission destination to the decompressed image data; and
transferring the image processing performed image data to the transmission destination, wherein
said display unit controls display and non-display of the guidance on said monitor depending on a transmission destination.

18. A method of shooting a transferring text using a digital camera, comprising:
monitoring a subject through a display unit at a monitoring command;
displaying guidance on said display unit during the monitoring;

capturing image data at a shooting command;
effecting image processing appropriate to a transmission destination to captured image data; and
transferring the image processing performed image data to the transmission destination, wherein
said display unit controls display and non-display of the guidance on said monitor depending on a transmission destination.

* * * * *